(12) United States Patent
Shah

(10) Patent No.: US 11,013,973 B1
(45) Date of Patent: May 25, 2021

(54) MARTIAL ARTS CONDITIONING AND TRAINING ASSEMBLY AND BALL SOCKET APPARATUS

(71) Applicant: Sagar Shah, San Diego, CA (US)

(72) Inventor: Sagar Shah, San Diego, CA (US)

( * ) Notice: Subject to any disclaimer, the term of this patent is extended or adjusted under 35 U.S.C. 154(b) by 0 days.

(21) Appl. No.: 16/425,737

(22) Filed: May 29, 2019

Related U.S. Application Data

(60) Provisional application No. 62/677,575, filed on May 29, 2018.

(51) Int. Cl.
*A63B 69/00* (2006.01)
*A63B 21/22* (2006.01)

(52) U.S. Cl.
CPC .......... *A63B 69/004* (2013.01); *A63B 21/222* (2015.10); *A63B 2225/093* (2013.01)

(58) Field of Classification Search
CPC .......... A63B 69/004; A63B 69/20–201; A63B 69/34; A63B 69/0091; A63B 69/203–208; A63B 2225/09–093; A63B 21/022; A63B 21/023; A63B 21/025; A63B 21/026; A63B 21/027; A63B 21/0442; A63B 21/0608; A63B 21/22–222; A63B 21/4049; A63B 2244/102–106
See application file for complete search history.

(56) References Cited

U.S. PATENT DOCUMENTS

| | | | | |
|---|---|---|---|---|
| 1,733,709 A | * | 10/1929 | Zinnow | A63B 69/203 |
| | | | | 482/90 |
| 4,150,580 A | * | 4/1979 | Silkebakken | A63B 21/22 |
| | | | | 446/233 |
| 4,564,192 A | * | 1/1986 | Lebowitz | A63B 69/004 |
| | | | | 446/334 |
| 5,389,057 A | | 2/1995 | Zagata | |
| 5,984,842 A | | 11/1999 | Chu | |
| 6,846,270 B1 | | 1/2005 | Etnyre | |
| 7,175,573 B1 | * | 2/2007 | Huang | A63B 21/0004 |
| | | | | 446/236 |
| 7,226,398 B2 | | 6/2007 | Fu | |
| 7,244,219 B1 | | 7/2007 | Preciado | |
| 7,559,881 B1 | * | 7/2009 | Roraff | A63B 21/023 |
| | | | | 482/126 |
| 7,651,447 B2 | | 1/2010 | Yang | |
| 7,665,035 B2 | | 2/2010 | Burnett | |
| 7,922,628 B2 | | 4/2011 | Gonzalez | |
| 8,439,809 B2 | | 5/2013 | Machado | |

(Continued)

*Primary Examiner* — Megan Anderson
*Assistant Examiner* — Kathleen Vermillera
(74) *Attorney, Agent, or Firm* — Garson & Gutierrez, PC

(57) ABSTRACT

Martial arts conditioning apparatus and methods of manufacture and use. In one embodiment, the martial arts conditioning apparatus includes a mounting post that includes a kicking post, the kicking post including a hemispherical structure disposed on a shaft of the kicking post; a base support structure that is configured to be mated with the hemispherical structure, the base support structure including a surface that is coupled to the martial arts conditioning apparatus via one or more of a first resistive apparatus and/or a first dampening apparatus; a multi-rod height adjuster assembly that is disposed adjacent the base support structure; and a resistive ball-socket mechanism that is coupled to the multi-rod height adjuster assembly via the use of a coupling mechanism.

19 Claims, 31 Drawing Sheets

(56) References Cited

U.S. PATENT DOCUMENTS

| | | | |
|---|---|---|---|
| 8,647,242 B2 | 2/2014 | Schlicher | |
| 8,740,759 B2 | 6/2014 | Knight | |
| 8,777,818 B1 | 7/2014 | Tate | |
| 9,132,309 B2 | 9/2015 | Bowers | |
| 9,808,694 B2 | 11/2017 | Stevens | |
| 2003/0186790 A1* | 10/2003 | Yu | A63B 21/0608 482/110 |
| 2005/0233870 A1* | 10/2005 | Gattis | A63B 69/20 482/83 |
| 2006/0270529 A1 | 11/2006 | Fields | |
| 2007/0142186 A1 | 6/2007 | Macnab | |
| 2007/0197348 A1 | 8/2007 | Ku | |
| 2011/0071007 A1* | 3/2011 | Signorino | A63B 69/20 482/83 |
| 2011/0160024 A1* | 6/2011 | Candela | A63B 23/0211 482/132 |
| 2011/0251024 A1 | 10/2011 | Hu | |
| 2014/0302969 A1 | 10/2014 | Chen | |

* cited by examiner

1008

MARTIAL ARTS CONDITIONING AND TRAINING ASSEMBLY AND BALL SOCKET APPARATUS

PRIORITY

This application claims the benefit of priority to U.S. Provisional Patent Application Ser. No. 62/677,575 filed May 29, 2018 entitled "Martial Arts Conditioning and Training Assembly and Methods of Manufacture and Use", the contents of which being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. TECHNOLOGICAL FIELD

The present disclosure relates generally to martial arts conditioning and training, and more particularly in one exemplary aspect to an assembly for use in, for example, martial arts conditioning and training.

2. DESCRIPTION OF RELATED TECHNOLOGY

Various martial arts training apparatus exist in the prior art. For example, a so-called mu ren zhuang (mandarin for "wooden man post") is typically a dummy made from wood that is used in Chinese martial arts training. These wooden man post designs are utilized to cultivate offensive and defensive fighting skills simultaneously. One such wooden man post design is known as the Wing Chun version which consists of three arms and one leg. The configuration of a Wing Chun wooden man post represents an opponent's body in various positions. Moreover, these wooden man posts may be mounted on wooden slats, which provides a level of springiness that is widely accepted to be similar to a human opponent's involuntary reaction during combat and therefore allows a user to, inter alia, practice absorbing energy into their stance.

Despite the variety and ubiquitous nature of these wooden man post designs, as well as various other types of martial arts training devices, there is a distinct lack of martial arts training devices that provide a user with more realistic resistance to various strikes and blocks. Moreover, many such martial training devices are not easily configurable, thereby providing a limited number of "looks" during martial arts training. Hence, there is a salient need for a martial arts training apparatus that provides for increased flexibility and customization for a user of such martial arts training apparatus.

SUMMARY

The present disclosure satisfies the aforementioned needs by providing for an improved martial arts conditioning apparatus, as well as methods for manufacturing and using the same.

In one aspect, a ball socket apparatus is disclosed. In one embodiment, the ball socket apparatus includes an encapsulating sphere; a core sphere that is configured to be received within the encapsulating sphere; a fore shaft that is coupled with the core sphere, the fore shaft configured to interact with a user of the martial arts conditioning apparatus; and a back shaft that is coupled with the core sphere opposite from the fore shaft, the back shaft further configured to be coupled with a resistive apparatus and/or a dampening apparatus.

In one variant, the ball socket apparatus further includes a ball socket base, the ball socket base being coupled to the encapsulating sphere, the ball socket base further being oriented substantially orthogonal with the fore shaft and the back shaft.

In another variant, the ball socket apparatus further includes the resistive apparatus and/or the dampening apparatus, the resistive apparatus and/or the dampening apparatus being coupled to the back shaft.

In yet another variant, the resistive apparatus and/or the dampening apparatus is oriented orthogonal with the back shaft.

In yet another variant, the resistive apparatus and/or the dampening apparatus is oriented parallel with the back shaft.

In yet another variant, the resistive apparatus and/or the dampening apparatus comprises a plurality of resistive apparatus and/or a plurality of dampening apparatus, wherein individual ones of the plurality of resistive apparatus and/or the plurality of dampening apparatus are collectively oriented both parallel and orthogonal with the back shaft.

In another aspect, a martial arts conditioning apparatus is disclosed. In one embodiment, the martial arts conditioning apparatus includes: a multi-rod height adjuster assembly, that includes: a bottom frame; a top frame; and a plurality of rods disposed between the bottom frame and the top frame, each of the plurality of rods comprising a plurality of first apertures; and a ball socket apparatus, the ball socket apparatus including: an encapsulating sphere; a core sphere that is configured to be received within the encapsulating sphere; a fore shaft that is coupled with the core sphere, the fore shaft configured to interact with a user of the martial arts conditioning apparatus; and a back shaft that is coupled with the core sphere opposite from the fore shaft, the back shaft further configured to be coupled with a resistive apparatus and/or a dampening apparatus.

In one variant, the ball socket apparatus is coupled with one or more of the plurality of rods of the multi-rod height adjuster assembly.

In another variant, the martial arts conditioning apparatus further includes a coupling mechanism that couples the ball socket apparatus to the one or more of the plurality of rods of the multi-rod height adjuster assembly, the coupling mechanism includes: a slider clasp that includes a plurality of second apertures; a slider lock configured to be received within individual ones of the plurality of first apertures and individual ones of the plurality of second apertures; a rotating clasp that is configured to be coupled to the slider clasp; and a rotating lock that is configured to be received within both the rotating clasp and the slider clasp.

In yet another variant, the rotating lock includes a shaft having a plurality points that each run along the shaft of the rotating lock.

In yet another variant, the plurality of points enable the ball socket apparatus to be oriented at a plurality of angles with respect to the multi-rod height adjuster assembly.

In yet another variant, the martial arts conditioning apparatus further includes a base support structure that is configured to mate with the multi-rod height adjuster assembly, the base support structure including: a base; a base support that is coupled with the base; and a base core sphere that is coupled with the base support.

In yet another variant, the martial arts conditioning apparatus further includes one or more elastic objects that couple the base of the base support structure to the multi-rod height adjuster assembly.

In yet another variant, the base of the base support structure has padding attached thereto.

In yet another variant, the padding attached to the base of the base support structure includes a trapezoidal prism shape.

In yet another variant, the martial arts conditioning apparatus further includes a kicking post, the kicking post including padding.

In yet another variant, the kicking post includes a cup-like hollow hemispherical structure, the cup-like hollow hemispherical structure being configured to receive the base core sphere of the base support structure.

In yet another variant, the martial arts conditioning apparatus further includes one or more elastic objects that couple the base of the base support structure to the multi-rod height adjuster assembly.

In yet another variant, the base of the base support structure has padding attached thereto.

In yet another variant, the padding attached to the base of the base support structure comprises a circular prism shape.

In yet another variant, the one or more elastic objects couple the base of the base support structure to one or more of the plurality of rods disposed between the bottom frame and the top frame of the multi-rod height adjuster assembly.

In yet another aspect, a gyro-shaft apparatus is disclosed. In one embodiment, the gyro-shaft apparatus includes an inner ring having a plurality of first apertures and a plurality of first studs; an outer ring that is larger in diameter than the inner ring, the outer ring having a plurality of second apertures and a plurality of second studs, at least a portion of the plurality of second apertures configured to receive the plurality of first studs; and a fore shaft having a first threaded interface, a back shaft having a second threaded interface, the fore shaft and the back shaft configured to be received within respective apertures of the plurality of first apertures, the first threaded interface configured to be mated with the second threaded interface. The back shaft is configured to have one or more resistive and/or dampening elements attached thereto.

In yet another aspect, methods of manufacturing the aforementioned apparatus are disclosed.

In yet another aspect, methods of using the aforementioned apparatus are disclosed.

Other features and advantages of the present disclosure will immediately be recognized by persons of ordinary skill in the art with reference to the attached drawings and detailed description of exemplary implementations as given below.

BRIEF DESCRIPTION OF THE DRAWINGS

The features, objectives, and advantages of the disclosure will become more apparent from the detailed description set forth below when taken in conjunction with the drawings, wherein.

All Figures disclosed herein are © Copyright 2018-2019 Sagar Shah.

All rights reserved.

Exemplary Martial Arts Training Apparatus—

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementations, but other implementations are possible by way of interchange of or combination with some or all of the described or illustrated elements. Wherever convenient, the same reference numbers will be used throughout the drawings to refer to same or like parts.

Figure 1:
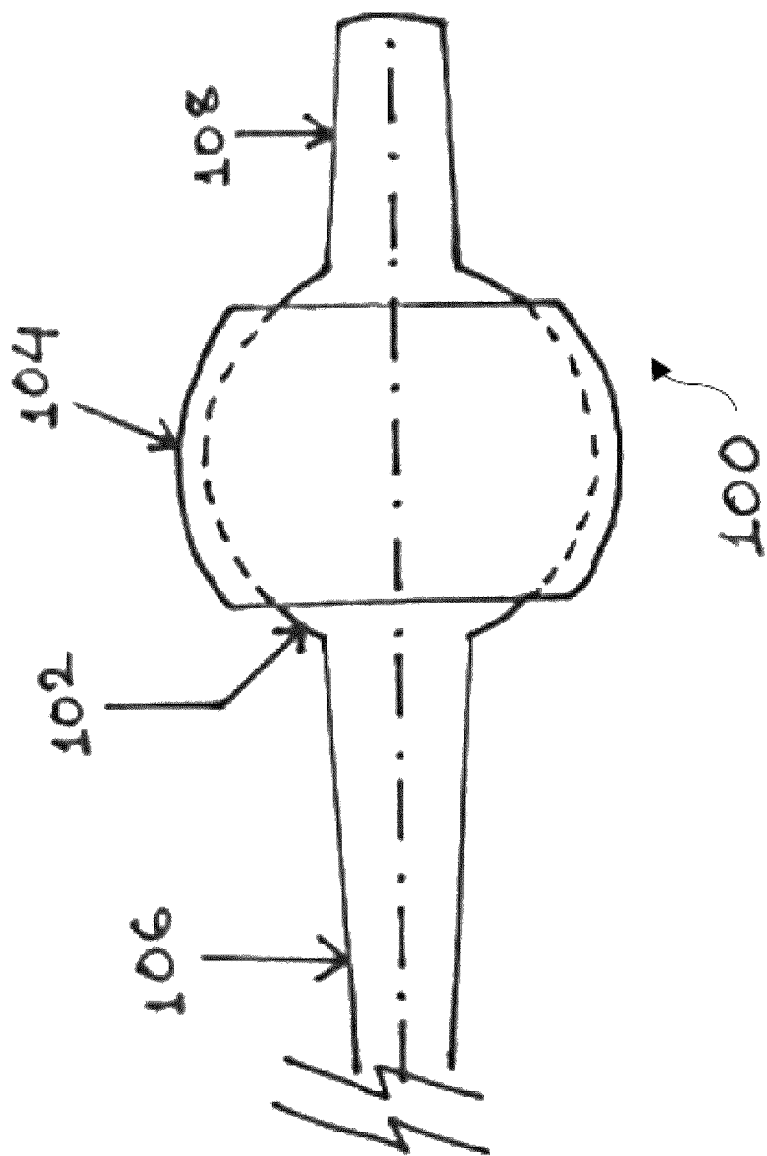
FIG. 1 is a perspective and right-side view of a resistive ball-socket apparatus in accordance with the principles of the present disclosure.

Referring now to FIGS. 1-6, exemplary implementations of a resistive ball-socket apparatus 100 are shown and described in detail. FIG. 1 illustrates a resistive ball-socket mechanism that includes an encapsulating sphere 104, a core sphere 102 that is configured to be received within the encapsulating sphere 104, a fore shaft 106 that is configured to interact with a user of the resistive ball-socket apparatus 100 and a back shaft 108 that is configured to be coupled with various resistive and/or dampening elements (see e.g., FIGS. 5 and 6). The resistive ball-socket apparatus 100 may be used to simulate, for example, a human shoulder and may provide for a number of possible movements. For example, the ball-socket apparatus 100 may pivot about the encapsulating sphere 104 while also allowing for rotation within the encapsulating sphere 104. Notably, the only limit on motion is with respect to motion going into (or out of) the encapsulating sphere 104. The fore shaft 106 and/or the back shaft 108 may be cylindrically shaped in some implementations or may include a polygon shaped cross-section in some implementations. For example, the polygon shape may include a square cross-section, a rectangular cross-section, a hexagonal cross-section, etc. The fore shaft 106 and/or the back shaft 108 may be tapered in some implementations. For example, the cross-sectional diameter of the fore shaft may be larger nearer the encapsulating sphere while being smaller away from the encapsulating sphere 104, or vice versa. Similarly, the cross-sectional diameter of the back shaft 108 may be larger nearer the encapsulating sphere 104 while being smaller away from the encapsulating sphere 104. See also, for example, FIG. 4.

Figure 2:
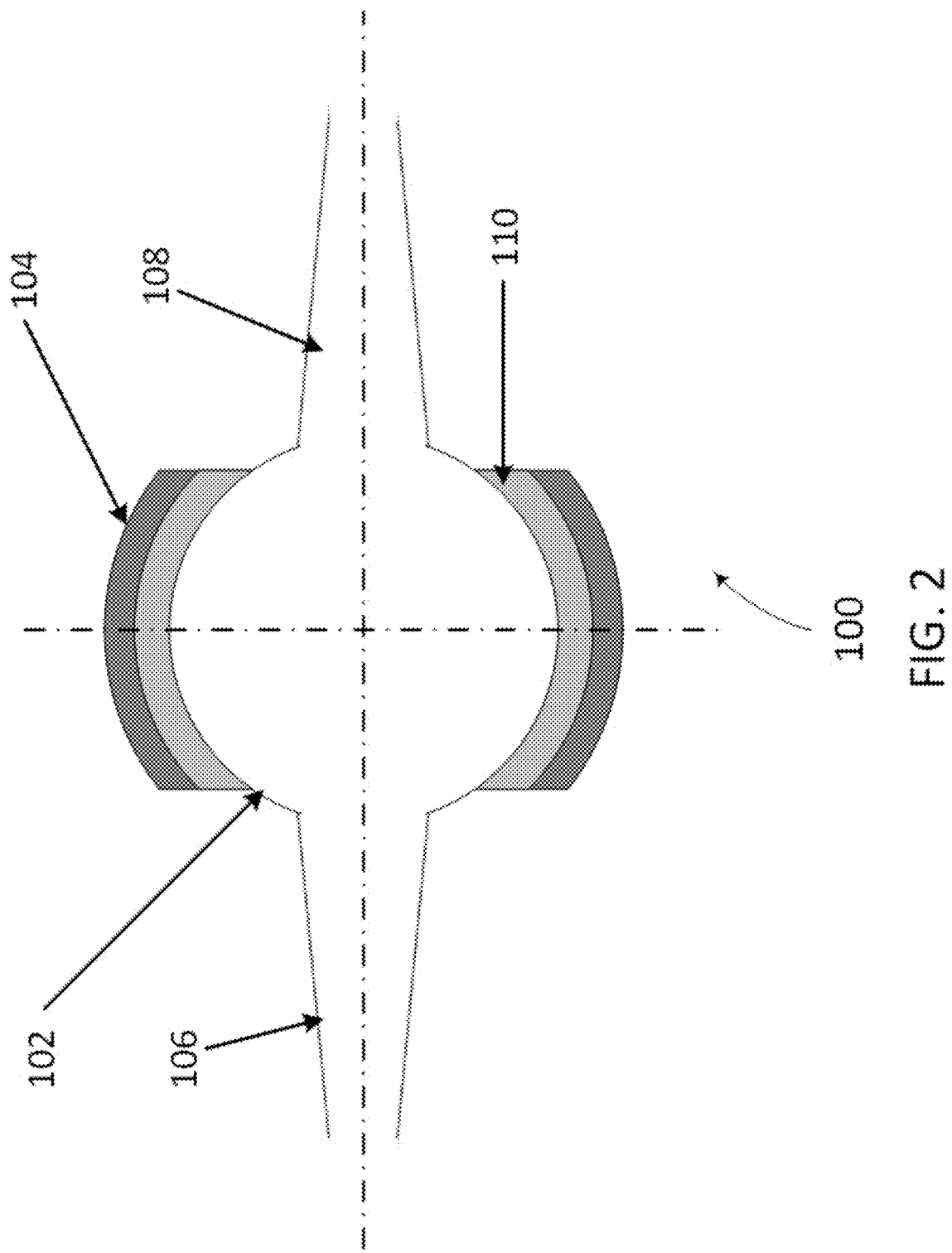
FIG. 2 is a cross-sectional view of the resistive ball-socket apparatus of FIG. 1 in accordance with the principles of the present disclosure.

FIG. 2 is a cross-sectional view of one exemplary resistive ball-socket apparatus 100. The encapsulating sphere 104 may be formed from a rigid or semi-rigid material. For example, the encapsulating sphere 104 may be formed from metal (e.g., aluminum, steel and the like) or may be formed from a durable polymer material. The core sphere 102 may be similarly formed from a rigid or semi-rigid material. The encapsulating sphere 104 may include cut-outs on opposing sides that enable the encapsulating sphere 104 to fixedly secure the core sphere 102, while being sized to allow for a desired range of movement. In some implementations, a lubricating layer may be disposed between the encapsulating sphere and the core sphere. For example, the lubricating layer 110 may include a solid lubricant (e.g., graphite, molybdenum disulfide, hexagonal boron nitride, tungsten disulfide, etc.). In some implementations, a liquid lubricant (e.g., a synthetic oil) may be utilized. In yet other implementations, the lubricating layer may consist of a treatment applied to the underlying encapsulating sphere 104 and/or the core sphere 102. For example, one or both of the encapsulating sphere 104 and/or the core sphere 102 may have an anodizing treatment applied to the underlying material in order to reduce, inter alia, friction. In some implementations, a dampening layer may be disposed between the encapsulating sphere 104 and the core sphere 102. The dampening layer may be used in order to reduce the rate of motion and/or avoid oscillations in the assembly when the applied tension is released. Combinations of the foregoing lubricating materials and/or dampening materials may be incorporated in some implementations. The incorporation of lubricating materials may provide for fluid movement of the fore shaft 106, thereby preventing mechanical locking in the presence of resistance.

Figure 3:
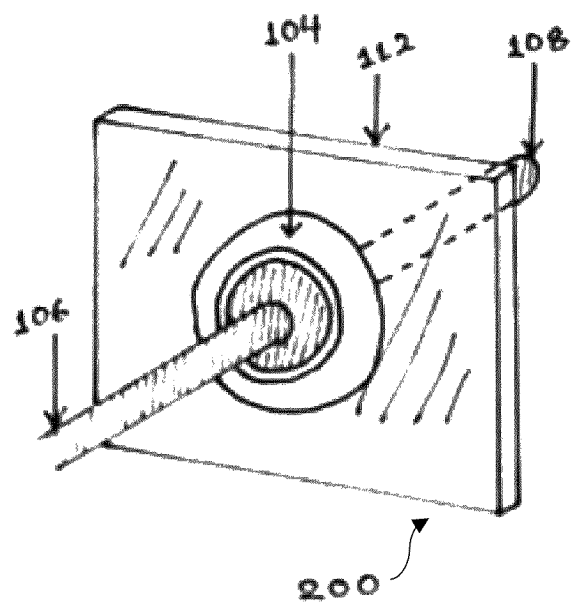
FIG. 3 is a perspective view of the resistive ball-socket apparatus of FIG. 1 mounted within a ball-socket base in accordance with the principles of the present disclosure.
Figure 4:
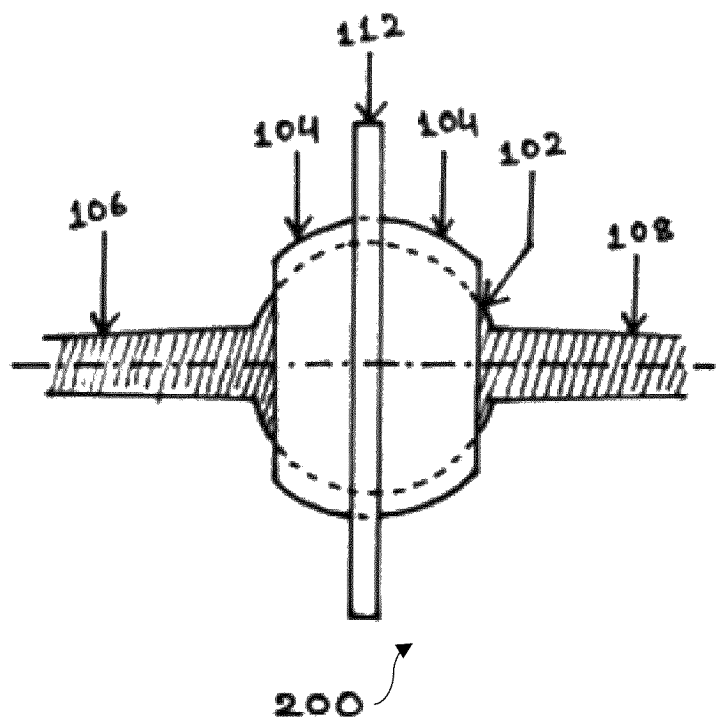
FIG. 4 is a cross-sectional view of the resistive ball-socket apparatus of FIG. 3 in accordance with the principles of the present disclosure.

FIG. 3 illustrates a variant in which the encapsulating sphere 104 may be incorporated (whether as an integral piece or via separate attachment) to a base 112. This base 112 may constitute a relatively flat polygon shape (e.g., a square as illustrated), although it would be readily appreciated that other form factors and thicknesses may be utilized for the base 112 in other implementations.

Figure 5:
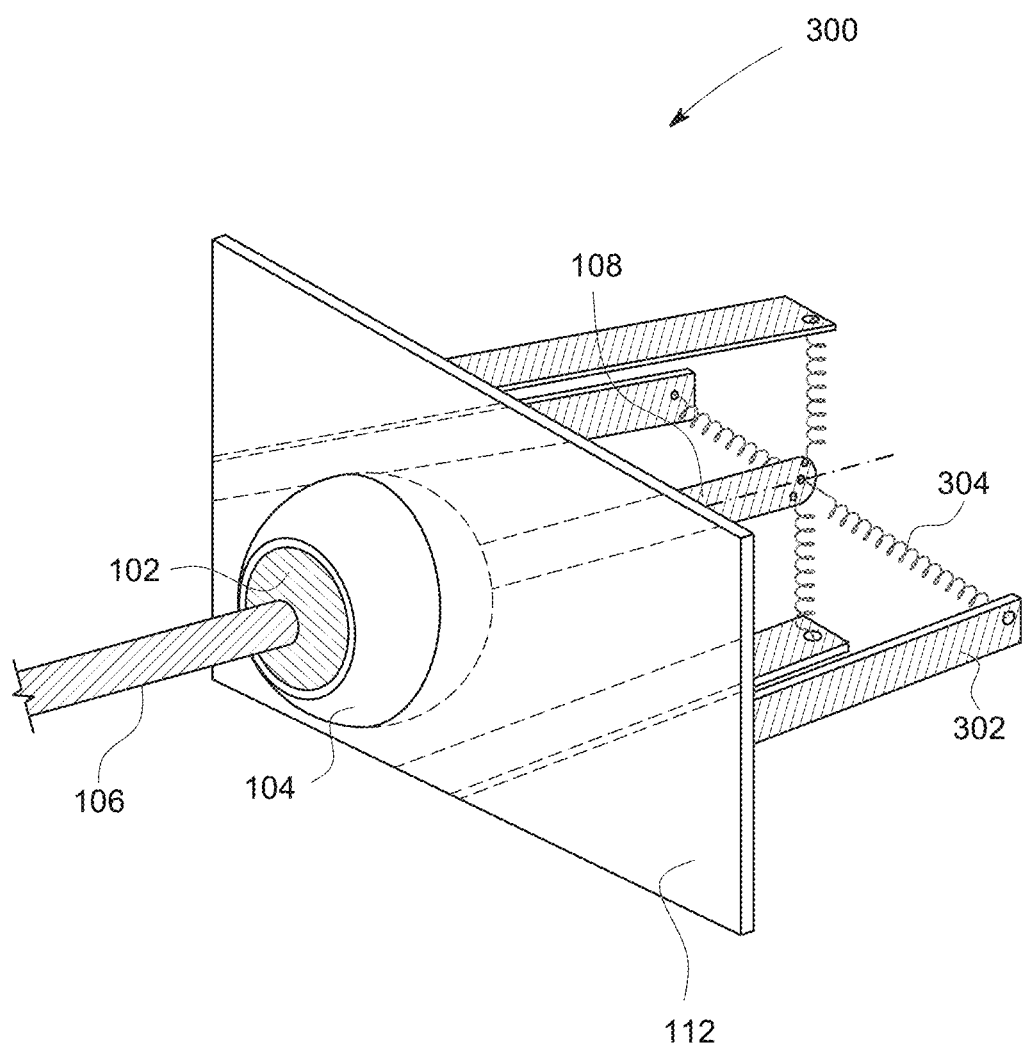
FIG. 5 is a perspective view of an exemplary implementation of a resistive ball-socket apparatus in accordance with the principles of the present disclosure.

FIG. 5 illustrates an exemplary implementation for the coupling of resistive (and/or dampening) elements 304 to the back shaft 108 of the resistive ball-socket apparatus 100. These resistive elements 304 are illustrated as springs in FIG. 5, although it would be appreciated that other elastic objects (e.g., resistance bands, resistance tubes, etc.) may be utilized in some implementations. Additionally, in some implementations, damper elements 304 may be utilized in conjunction with (or alternatively from), the aforementioned resistive elements 304. As illustrated in FIG. 5, the ball-socket base 112 may include resistance support structures 302 that support the opposing ends of the resistive elements 304. For example, as shown, the resistance support structures 302 may be included on the top, bottom, left, and right portion of the back shaft 108 such that the resistive elements 304 are disposed orthogonal with the back shaft 108. It would be readily appreciated that more (or less) resistance support structures 302 may be used in alternative variants.

Additionally, the precise positioning of the resistance support structures 302 may also be varied in some implementations.

Figure 6:
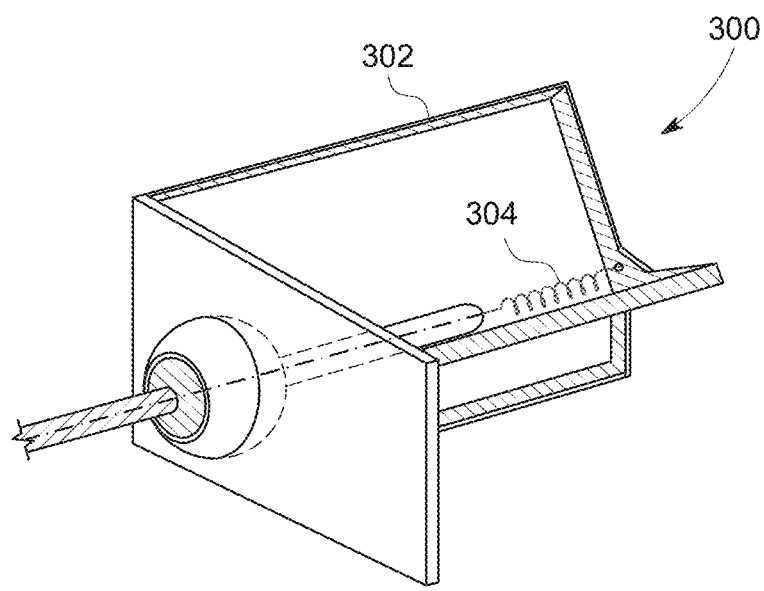
FIG. 6 is a perspective and right-side view of another exemplary implementation of a resistive ball-socket apparatus in accordance with the principles of the present disclosure.
Figure 6:
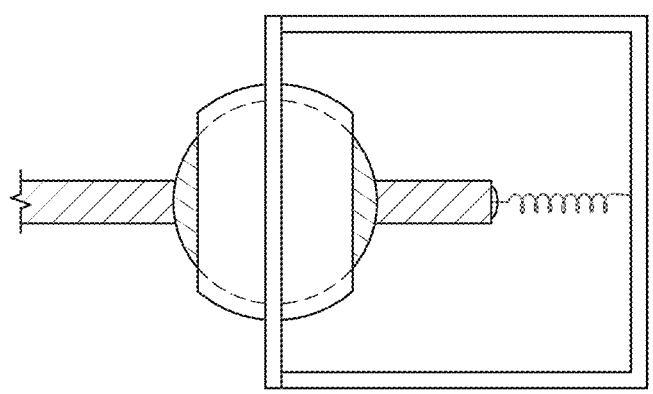
Figure 21:
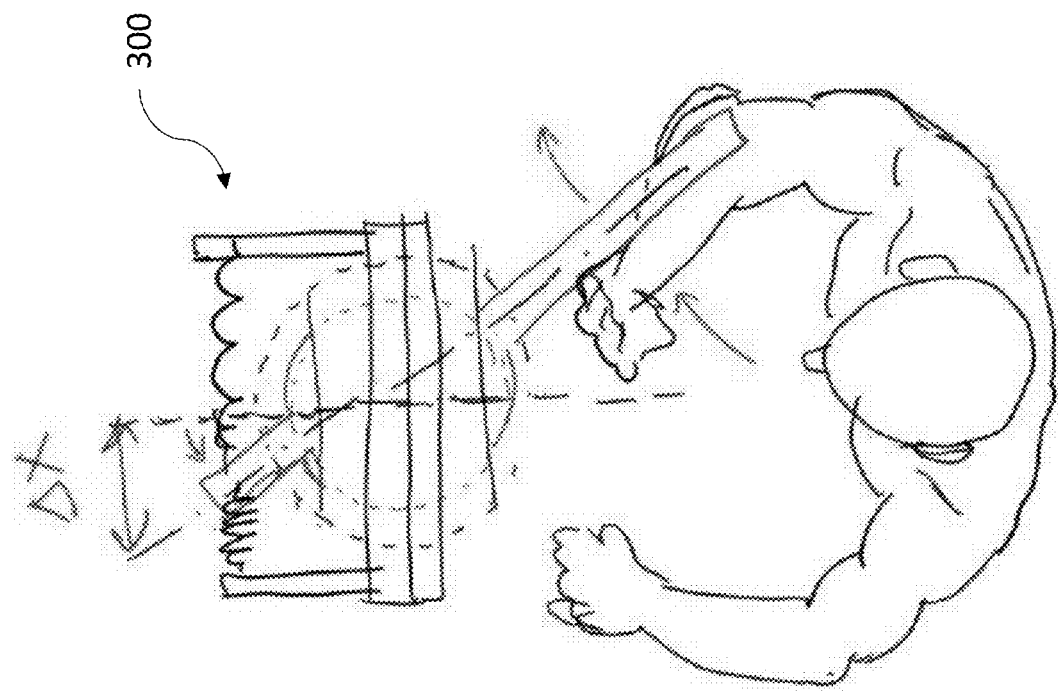
FIG. 21 is a top plan view illustrating the principles of operation for the resistive ball-socket apparatus of FIG. 3 in accordance with the principles of the present disclosure.
Figure 21:
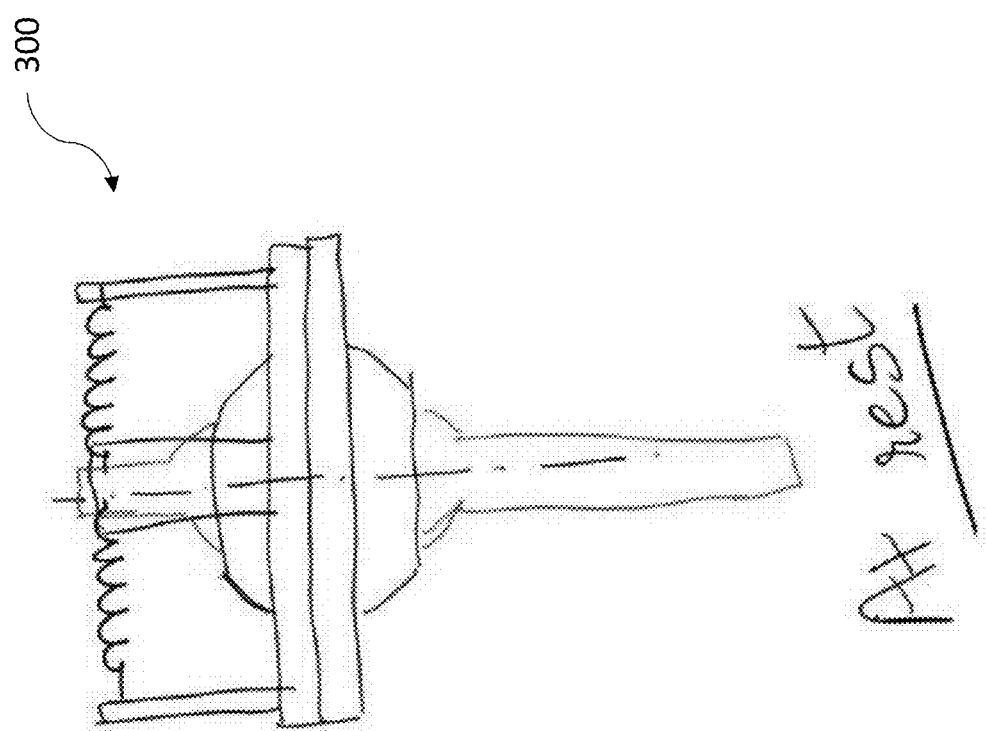
Figure 22:
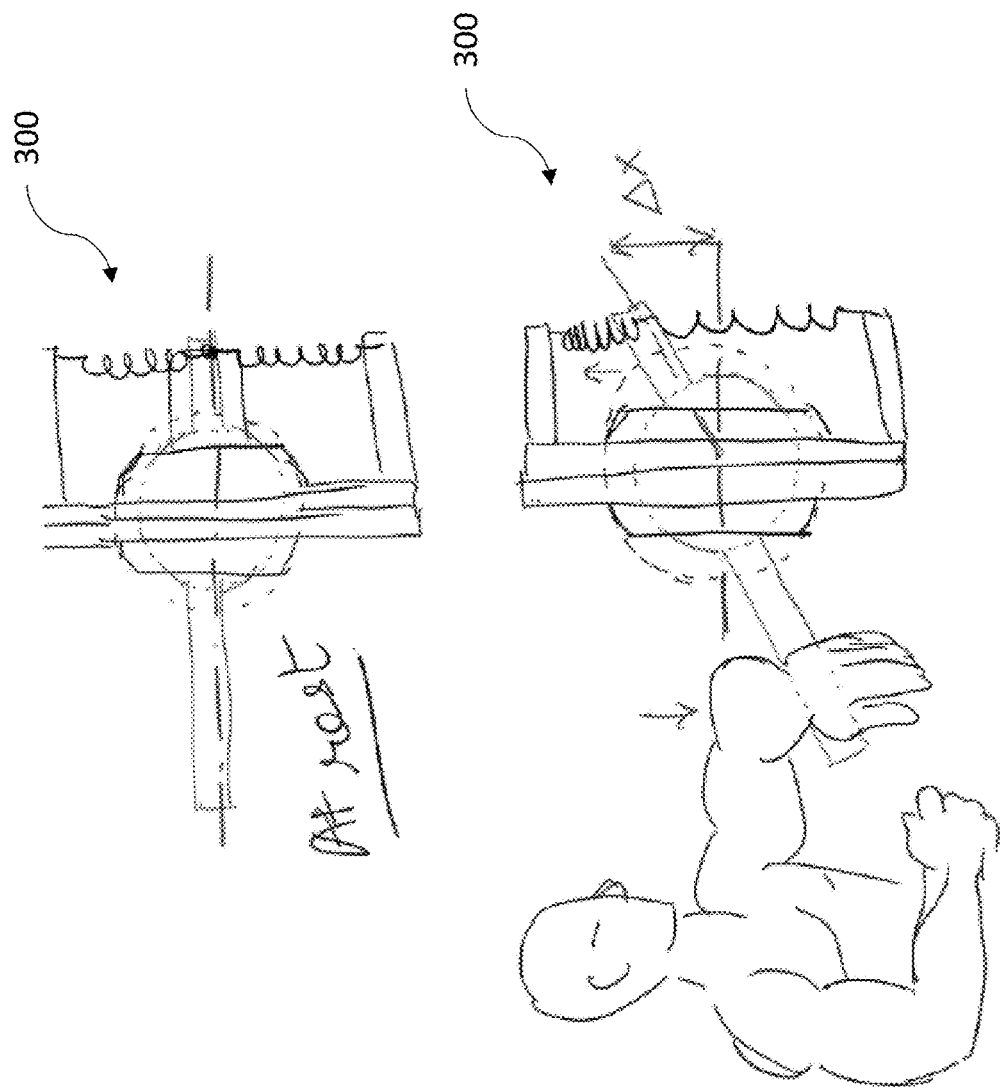
FIG. 22 is a right-side view illustrating the principles of operation for the resistive ball-socket apparatus of FIG. 3 in accordance with the principles of the present disclosure.
Figure 23:
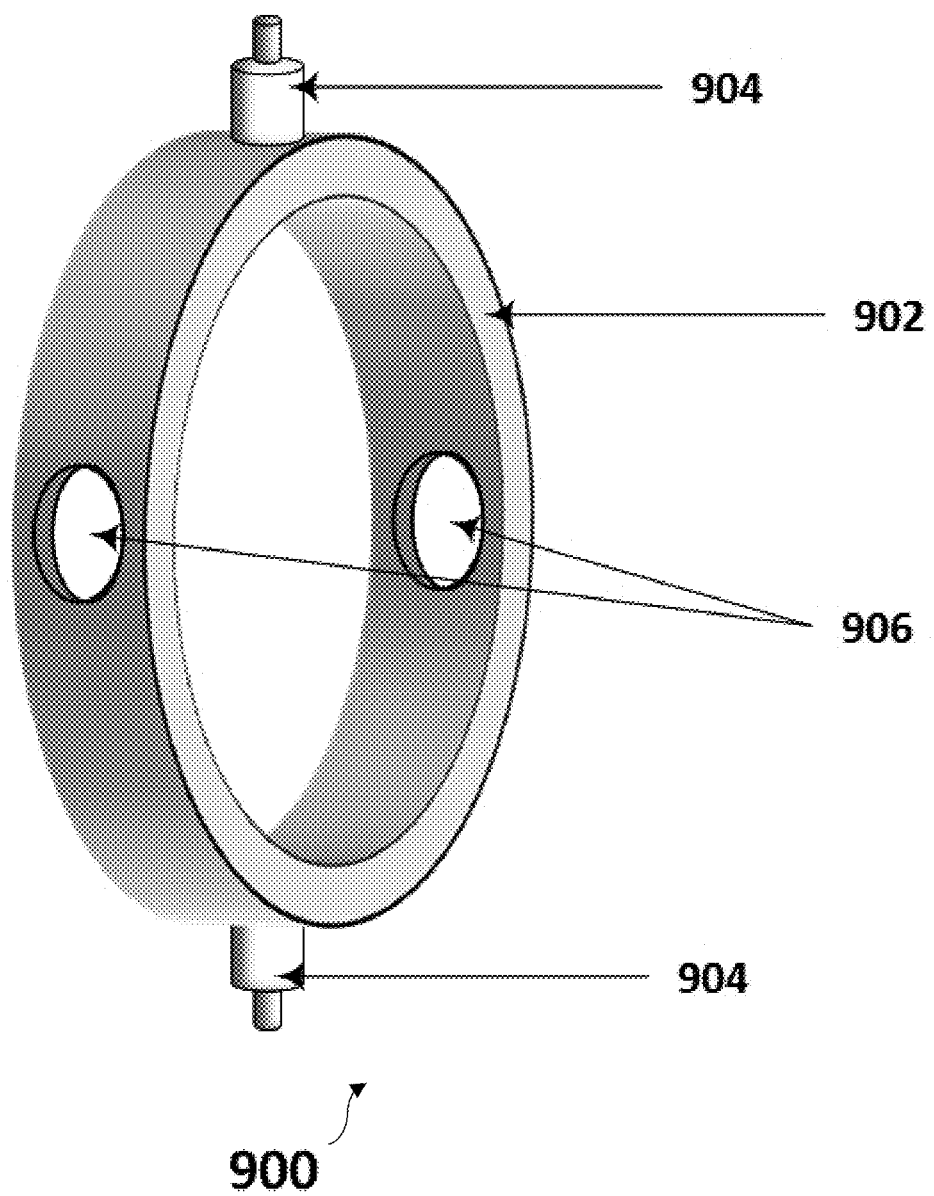
FIG. 23 is a perspective view of the inner ring of a gyro-shaft resistive mechanism in accordance with the principles of the present disclosure.
Figure 24:
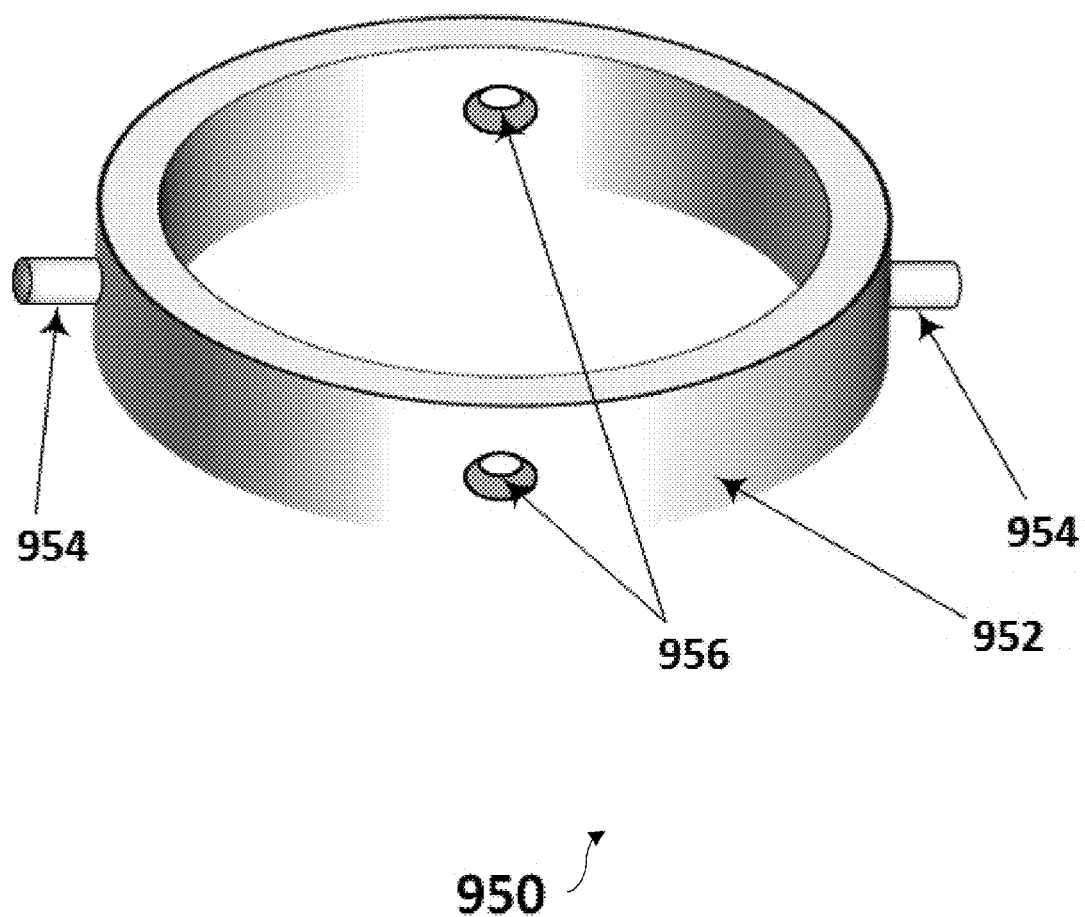
FIG. 24 is a perspective view of the outer ring of a gyro-shaft resistive mechanism in accordance with the principles of the present disclosure.

FIG. 6 illustrates an alternative variant where a resistive element 304 is disposed parallel with the back shaft 108. As illustrated the support structures 302 are included on the top left corner, the top right corner and the bottom edge, although the precise number and positions for these support structures 302 may be varied in some implementations. In some implementations, combinations of the orthogonal (e.g., FIG. 5) and parallel (e.g., FIG. 6) resistive (and/or dampening) elements 304 may be included in alternative variants. These resistive (and/or dampening) elements 304 may provide for resistance/dampening when performing basic martial arts conditioning exercises. FIGS. 21 and 22 illustrate example motions for the resistive ball-socket apparatus 100.

Figure 7:
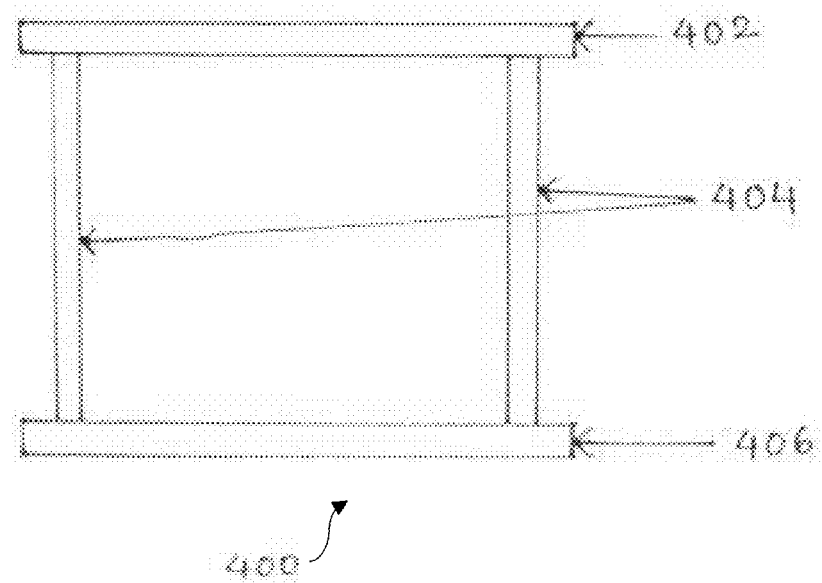
FIG. 7 is a front plan view of a multi-rod height adjuster assembly in accordance with the principles of the present disclosure.
Figure 8:
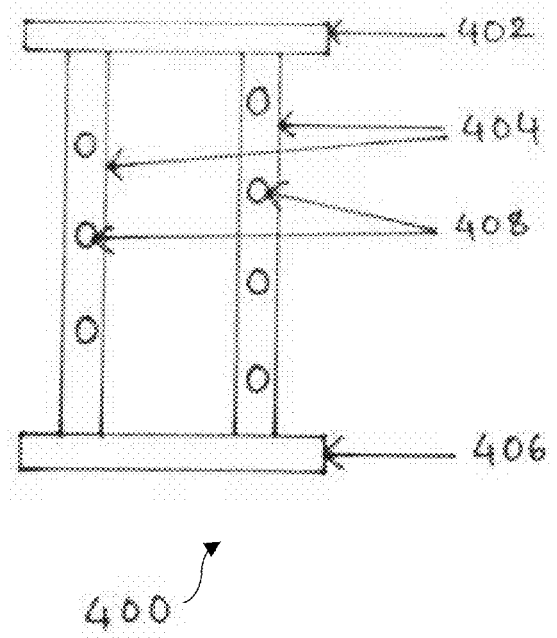
FIG. 8 is a right-side view of the multi-rod height adjuster assembly of FIG. 7 in accordance with the principles of the present disclosure.
Figure 9:
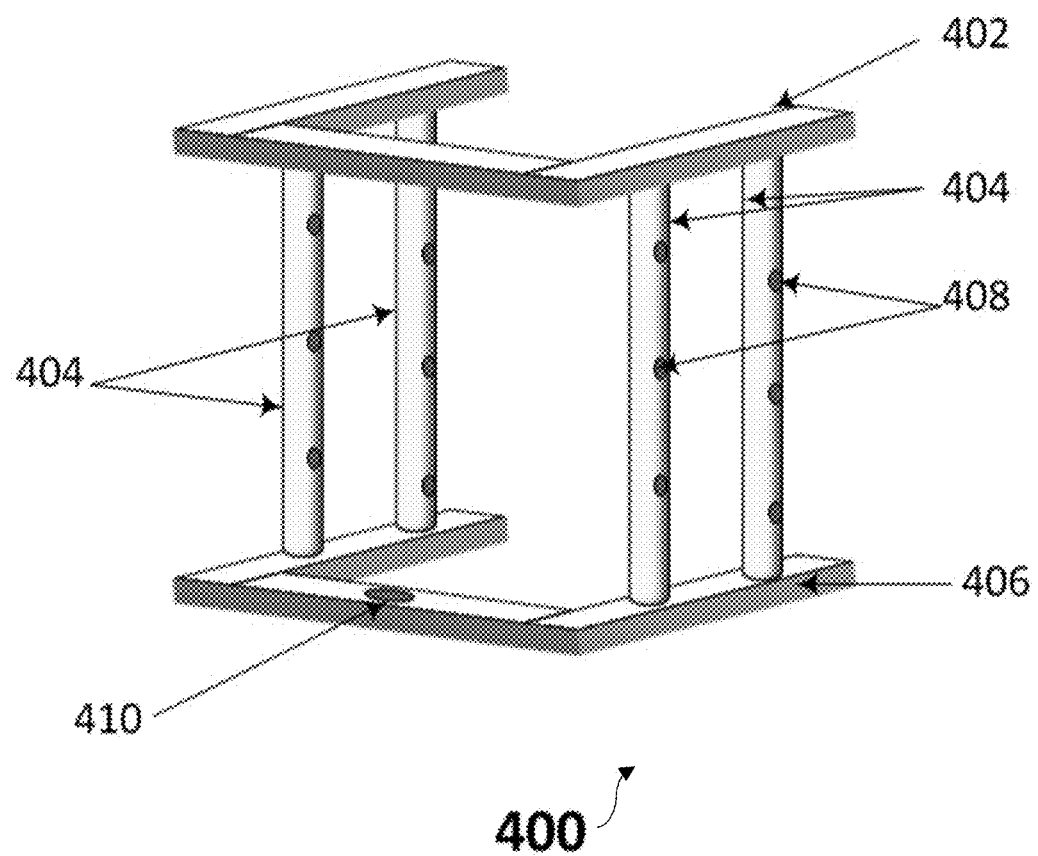
FIG. 9 is a perspective view of the multi-rod height adjuster assembly of FIG. 7 in accordance with the principles of the present disclosure.

FIGS. 7-9 illustrate a multi-rod height adjuster assembly 400. The multi-rod height adjuster assembly 400 may include a bottom frame 406, a top frame 402 and a plurality of rods 404 that are disposed between the top frame 402 and the bottom frame 406. In the illustrated embodiment, the multi-rod height adjuster assembly 400 includes two rods 404 on each side. As illustrated in FIG. 8, the rods 404 include a plurality of through holes 408 with through holes 408 being disposed offset on one rod 404 with respect to the second rod 404. These offset through holes 408 enable finer granularity in adjustment of height for the resistive ball-socket apparatus 100 (see, e.g., FIG. 19). While two rods 404 are shown in FIG. 8, it would be readily appreciated that three or more rods 404 may be utilized in some implementations, dependent upon the specific design requirements for the exercises that are to be performed. FIG. 9 illustrates an isometric view for the multi-rod height adjuster assembly 400 illustrated in FIGS. 7 and 8. As illustrated, the bottom frame 406 may consist of an aperture 410 that allows a base support structure 600 (see, e.g., FIGS. 12-15) to be attached thereto.

Figure 10:
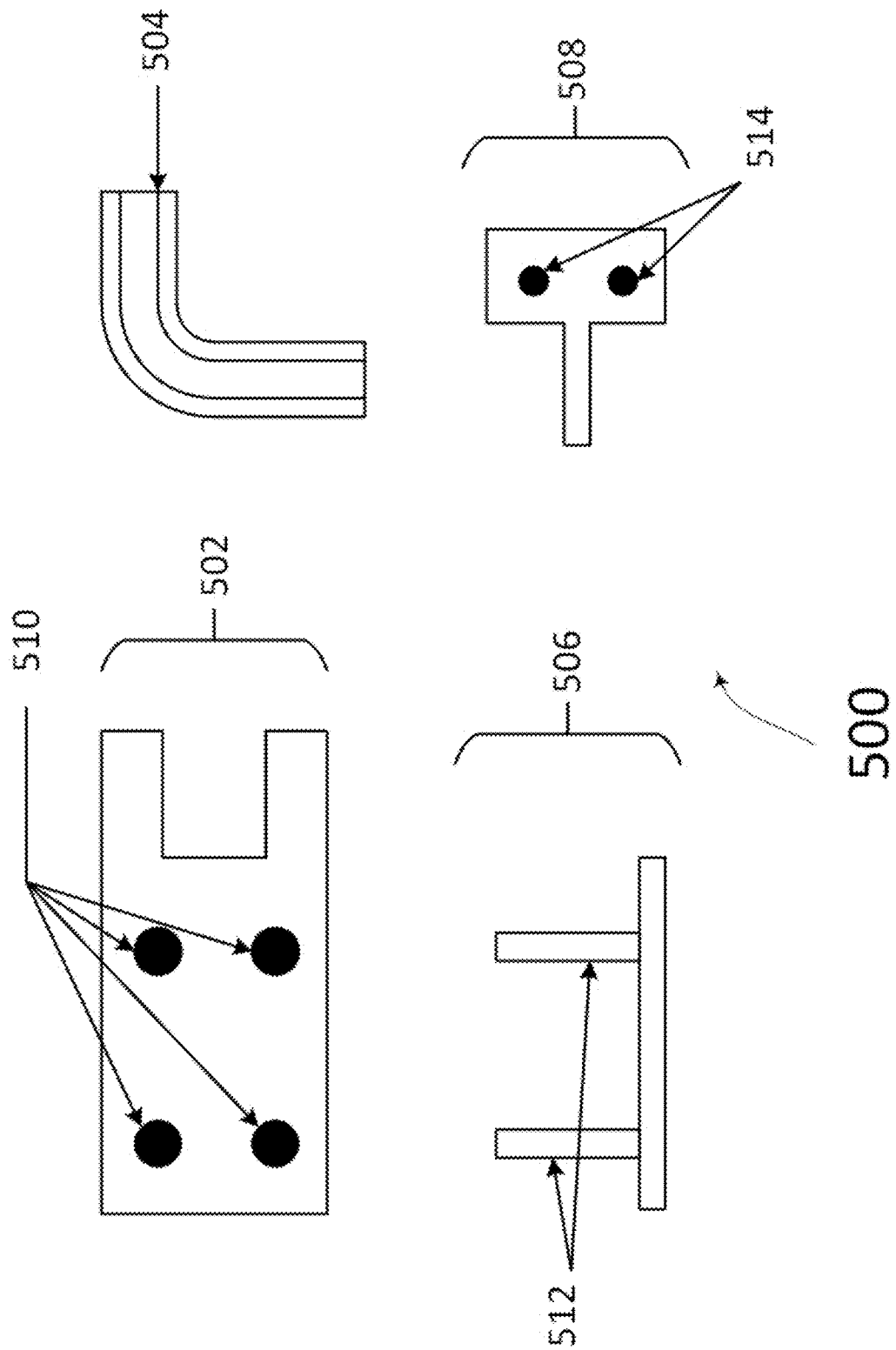
FIG. 10 is a front view illustrating various components of a coupling mechanism in accordance with the principles of the present disclosure.
Figure 11:
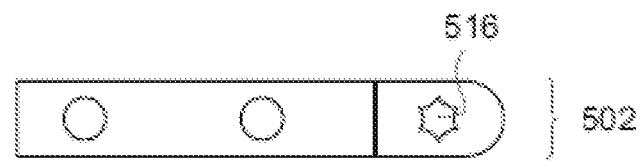
FIG. 11 is a top and isometric view of various components of the coupling mechanism of FIG. 10 in accordance with the principles of the present disclosure.
Figure 11:
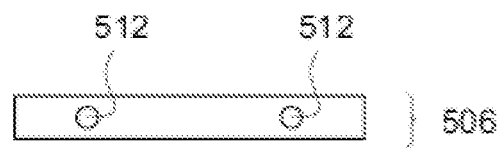
Figure 11:
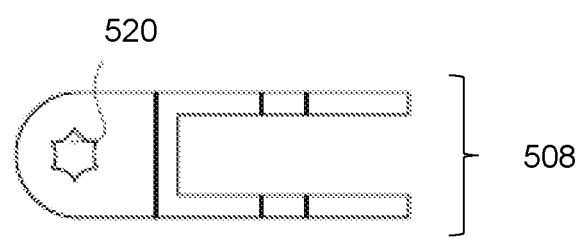
Figure 11:
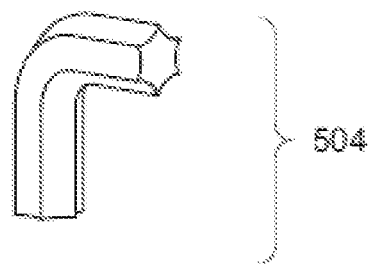
Figure 12:
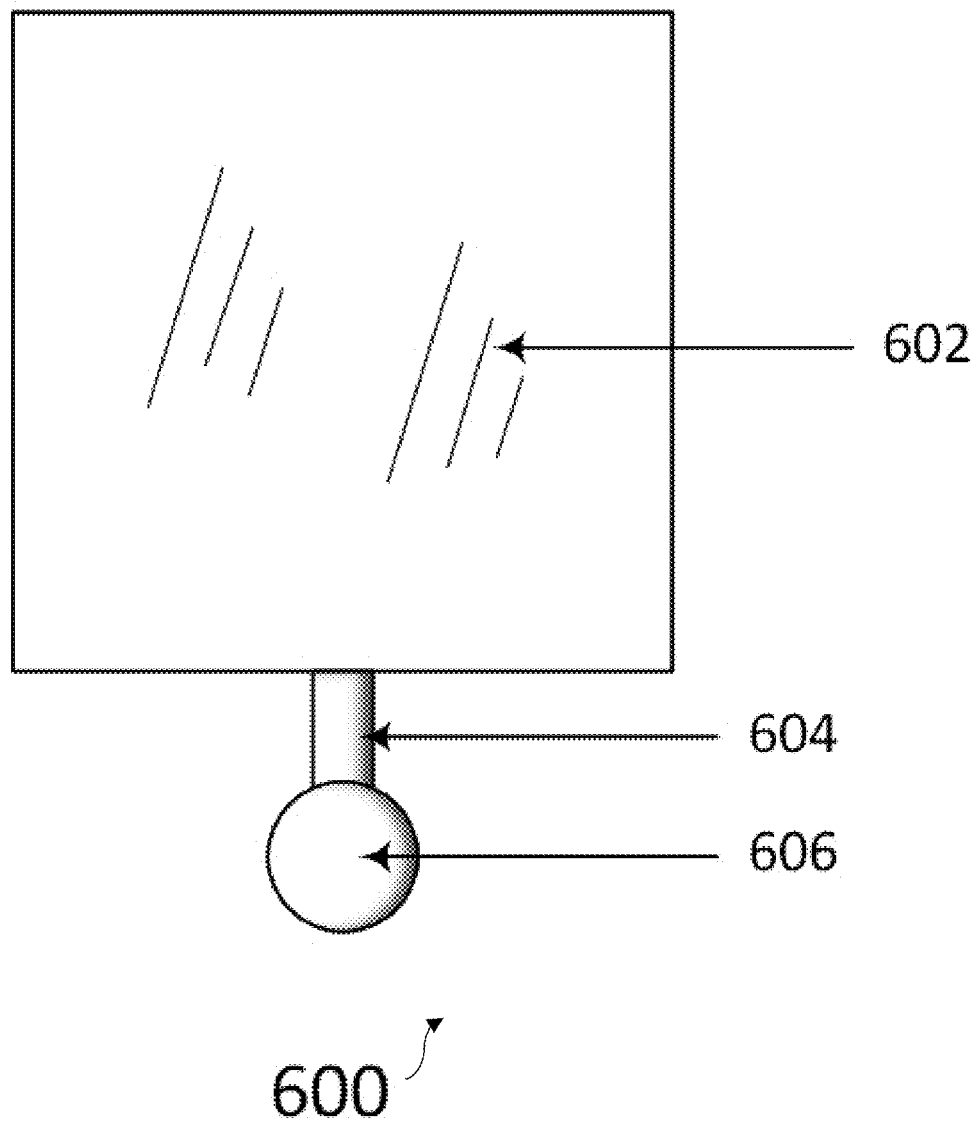
FIG. 12 is a front view of a base support structure in accordance with the principles of the present disclosure.

FIGS. 10 and 11 illustrate components of the coupling mechanism 500 for coupling the resistive ball-socket apparatus 100 to the multi-rod height adjuster assembly 400. The coupling mechanism 500 includes a slider clasp 502, a slider lock 506 and a rotating clasp 508 and rotating lock 504. The slider clasp 502 may contain holes 518 on the top portion where the rods 404 of the multi-rod height adjuster assembly 400 will go through; the number of holes 518 may depend on the number of rods 404 in the multi-rod assembly 400. For the case of a two-rod assembly, the slider clasp 502 may contain two holes 518 on the top where the rods 404 will go through. In some variants, the number of holes 518 on the slider clasp 502 may not equal the number of rods 404 on the multi-rod height adjuster assembly 400. For example, the number of rods 404 on the multi-rod height adjuster assembly may be three (3), while the number of holes 518 on the slider clasp 502 may be two (2). In such a variant, the coupling mechanism 500 enables, for example, the resistive ball-socket apparatus 200 to be varied in position (i.e., more towards the front of the apparatus if the front two rods 404 are used or more towards the back of the apparatus if the back two rods 404 are used, etc.). These and other variants would be readily apparent to one of ordinary skill given the contents of the present disclosure.

The slider clasp 502 may also contain holes 510 on the front portion whose number may be the square of the number of rods 404 in the multi-rod assembly e.g. for a three-rod assembly the slider clasp 502 may contain nine holes 510 on the front surface. In the case of a two-rod assembly, the slider clasp 502 may contain four holes 510 on the front (as shown in FIG. 10) of which the two diagonal holes will correspond to the holes 408 on the rods 404. The slider clasp 502 may lock in place on the dual rods 404 using, for example, the slider lock 506. The slider lock 506 may include two small narrow rods (or studs) 512 that will be inserted into the dual-rod 404 through the diagonal slider clasp apertures 510. The number of narrow rods (or studs) 512 on the slider lock 506 may depend on the number of rods 404 in the multi-rod assembly 400.

The slider clasp 502 may be connected to the resistive ball-socket apparatus 100 using the rotating clasp 508. The slider clasp 502 may contain a structure 516 similar to the structure 520 on the rotating clasp 508, and the position of the rotating clasp 508 will be maintained with respect to the slider clasp 502 by inserting the rotating lock 504 into these structures 516, 520. These structures 516, 520 on the slider clasp 502 and the rotating clasp 508, respectively, will contain apertures in the shape of the cross-section of the rotating lock 504 (albeit reversed). For example, the through hole 520 for the rotating clasp 508 may include six points as illustrated that correspond to the points contained on the rotating lock 504. Additional granularity may be realized through the addition of additional points on the through holes 516, 520 and rotating lock 504. Conversely, reduced granularity may be realized through the reduction of points on the through holes 516, 520 and rotating lock 504. The coupling mechanism allows for rotating the resistive ball-socket apparatus 100 sideways with respect to the "front" of the device by removing the rotating lock 504, changing the angle of the rotating clasp 508 with respect to the slider clasp 502 and then re-inserting the rotating lock 504 such that it passes through the rotating lock apertures 516, 520 of the slider clasp 502 and the rotating clasp 508. The slider clasp 502 also allows for the changing of the vertical position of the resistive ball-socket apparatus by removing the slider lock 506, moving the slider clasp 502 up or down on the rods 404 of the multi-rod height adjuster assembly 400, and then re-inserting the slider lock 506.

Figure 13:
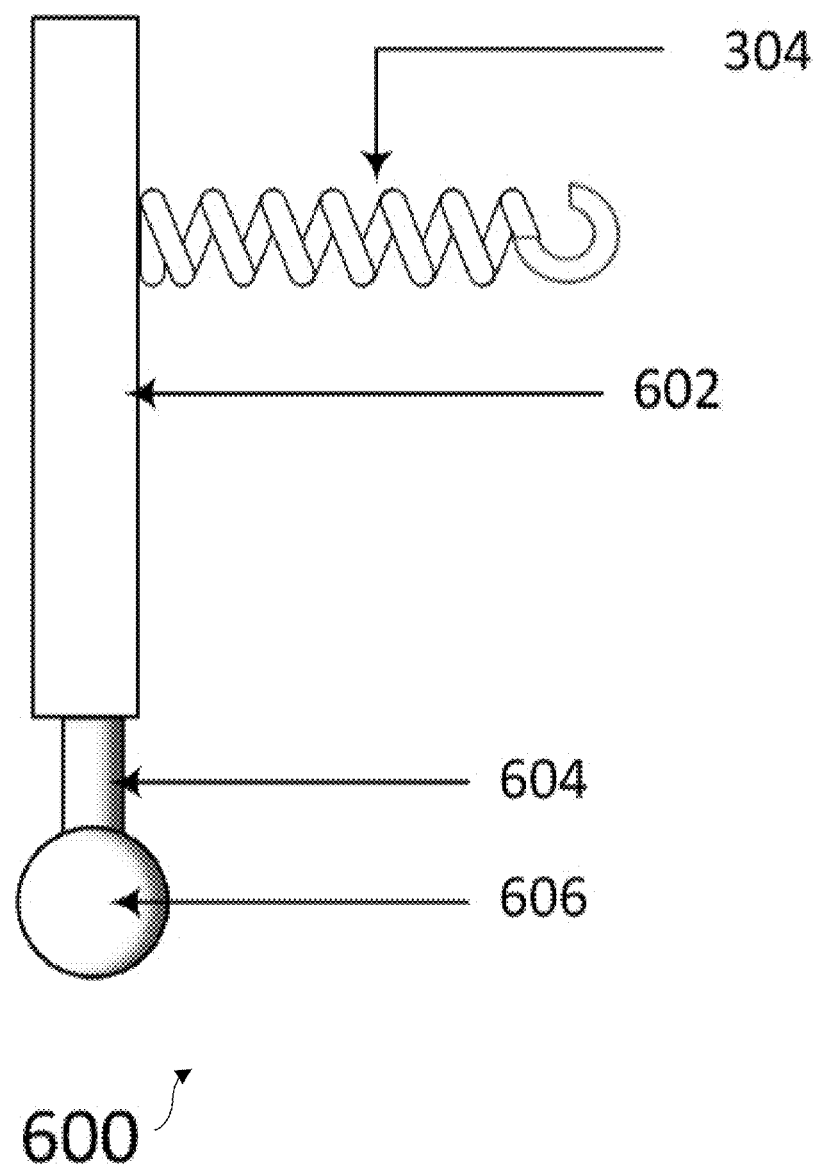
FIG. 13 is a right-side view of the base support structure of FIG. 12 in accordance with the principles of the present disclosure.
Figure 14:
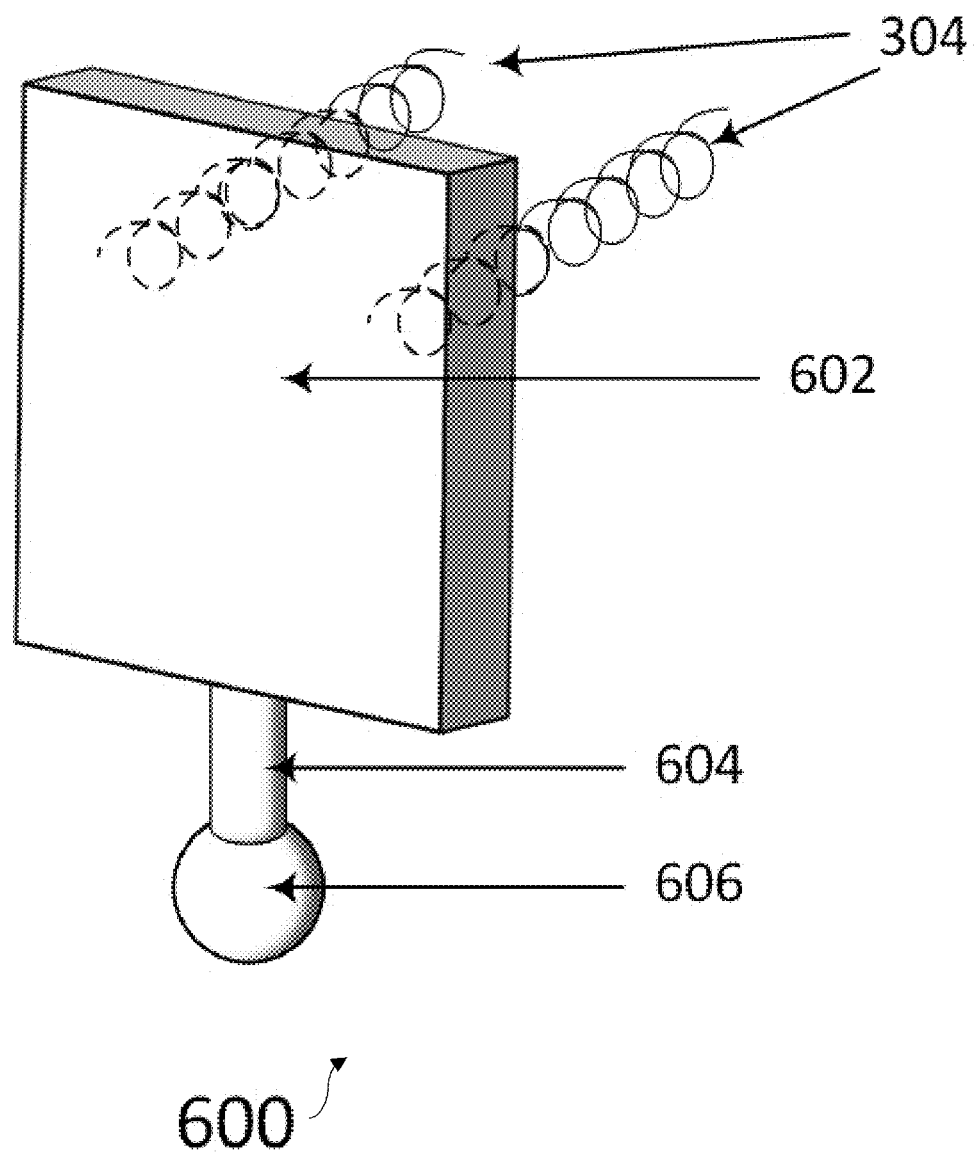
FIG. 14 is a perspective view of the base support structure of FIG. 12 in accordance with the principles of the present disclosure.
Figure 15:
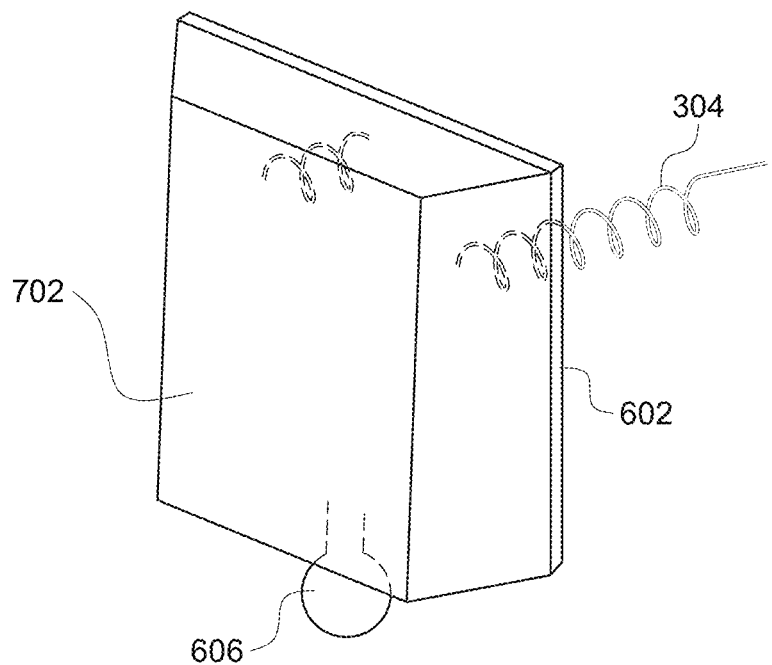
FIG. 15 are perspective views of the base support structure of FIG. 12 with different base paddings in accordance with the principles of the present disclosure.
Figure 15:
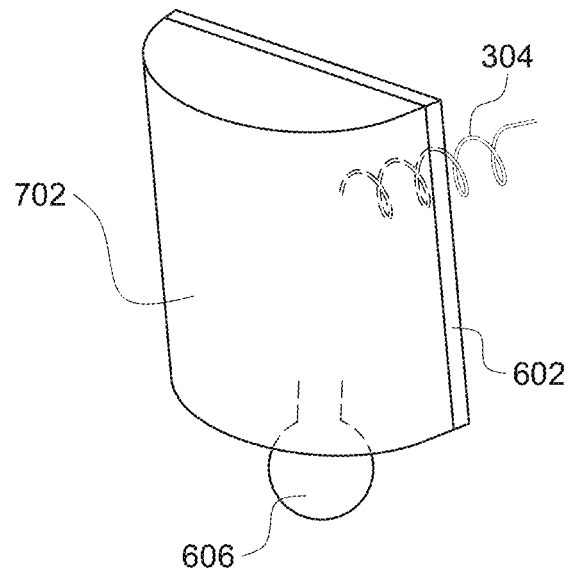

FIGS. 12-15 illustrate a base support structure 600 for mating with, for example, the aperture 410 located on the bottom frame 406 of the multi-rod height adjuster assembly 400. See, e.g., FIG. 9. The base support structure 600 may consist of a solid surface or base 602, a base support 604 and a base core sphere 606. FIG. 13 illustrates the base support structure 600 with a resistive (and/or dampening) element 304 attached thereto. In the illustrated embodiment, the resistive (and/or dampening) element 304 is disposed orthogonal with the solid surface 602, although it would be readily appreciated that alternative variants may position the resistive (and/or dampening) element 304 at other angles (e.g., parallel with solid surface 602, at an angle with respect to the solid surface 602, etc.). FIG. 14 illustrates an implementation in which multiple resistive (and/or dampening) elements 304 are attached to the base support structure 600. FIG. 15 illustrates the use of optional pads 702 with the base support structure 600. For example, as illustrated, the base support structure 600 may include trapezoidal prism padding 702 or may include circular prism padding 702. In other variants (not shown), other shaped padding 702 (e.g., rectangular) may be readily substituted.

Figure 16:
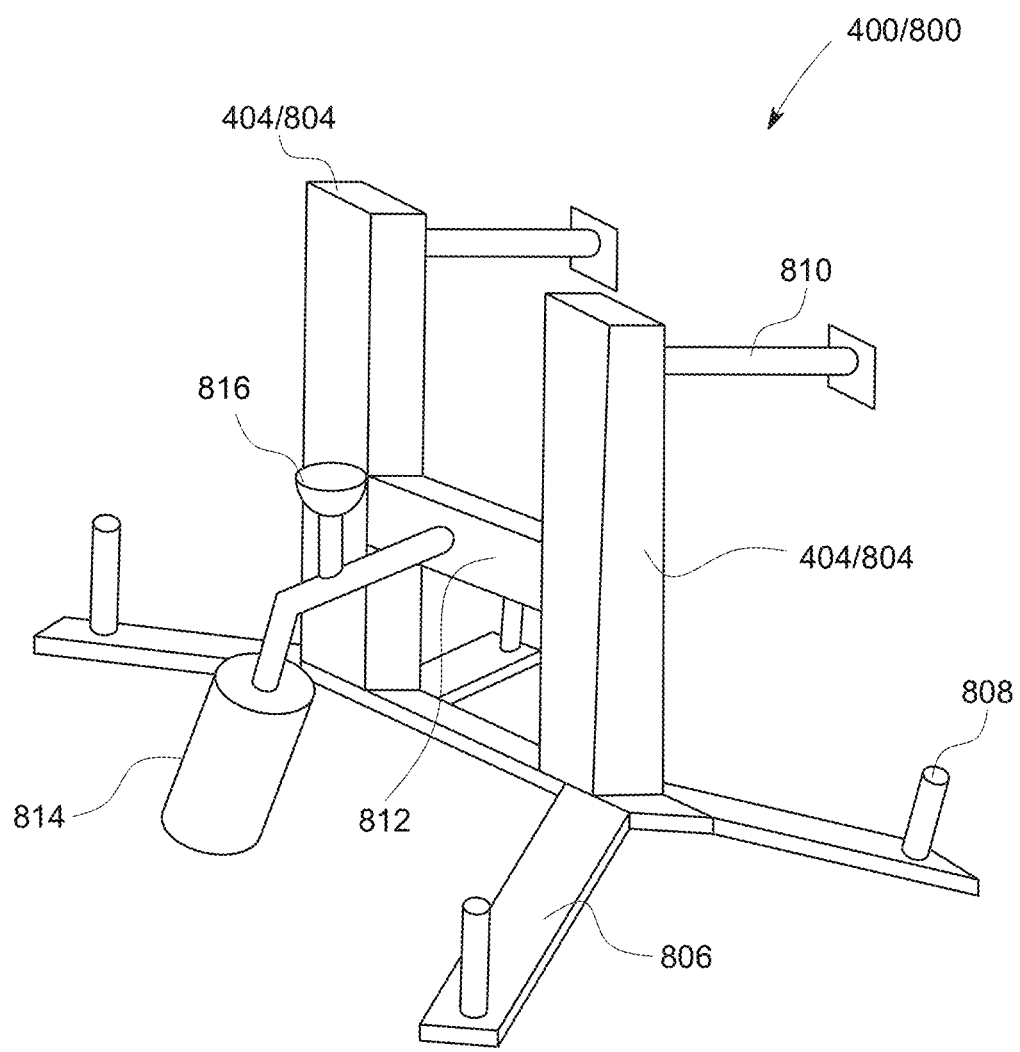
FIG. 16 is a perspective view of a mounting post in accordance with the principles of the present disclosure.

FIG. 16 illustrates an exemplary mounting post 800. As illustrated, the mounting post 800 consists of two vertical posts 804 that are connected to each other on one end with a horizontal support 806 and in the middle via a horizontal post 812. The two vertical posts 804 contain structures 810 on the back side for enabling the fixing of the mounting post 800 to, for example, a wall. These vertical posts 804 may also contain structures for affixing the other ends of the elastic objects attached to the base. The bottom horizontal support 806 contains multiple horizontal structures 808 to allow for standing support. These structures contain cylindrical vertical structures 808 to allow mounting weights to be installed thereon in order to resist, for example, rotational motion of the complete mounting post 800 during use. The horizontal post 812 may contain a rigid extension to it which is called a kicking post 814 which may also have mounted via a cup-like hollow hemispherical structure 816. This hemispherical structure 816 may act as a support for the core-sphere 606 of the base assembly 600.

Figure 17:
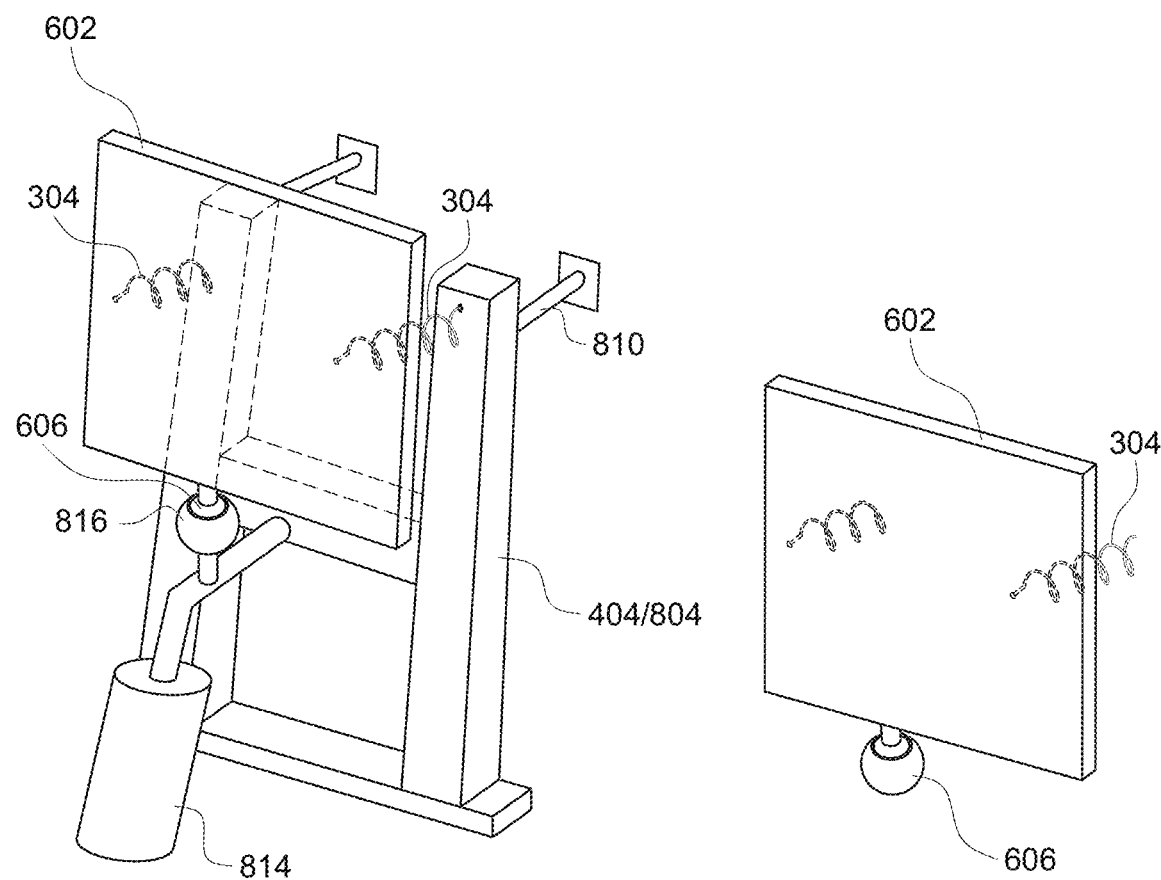
FIG. 17 is a perspective view of a mounting post with the base support structure of FIG. 12 in accordance with the principles of the present disclosure.
Figure 18:
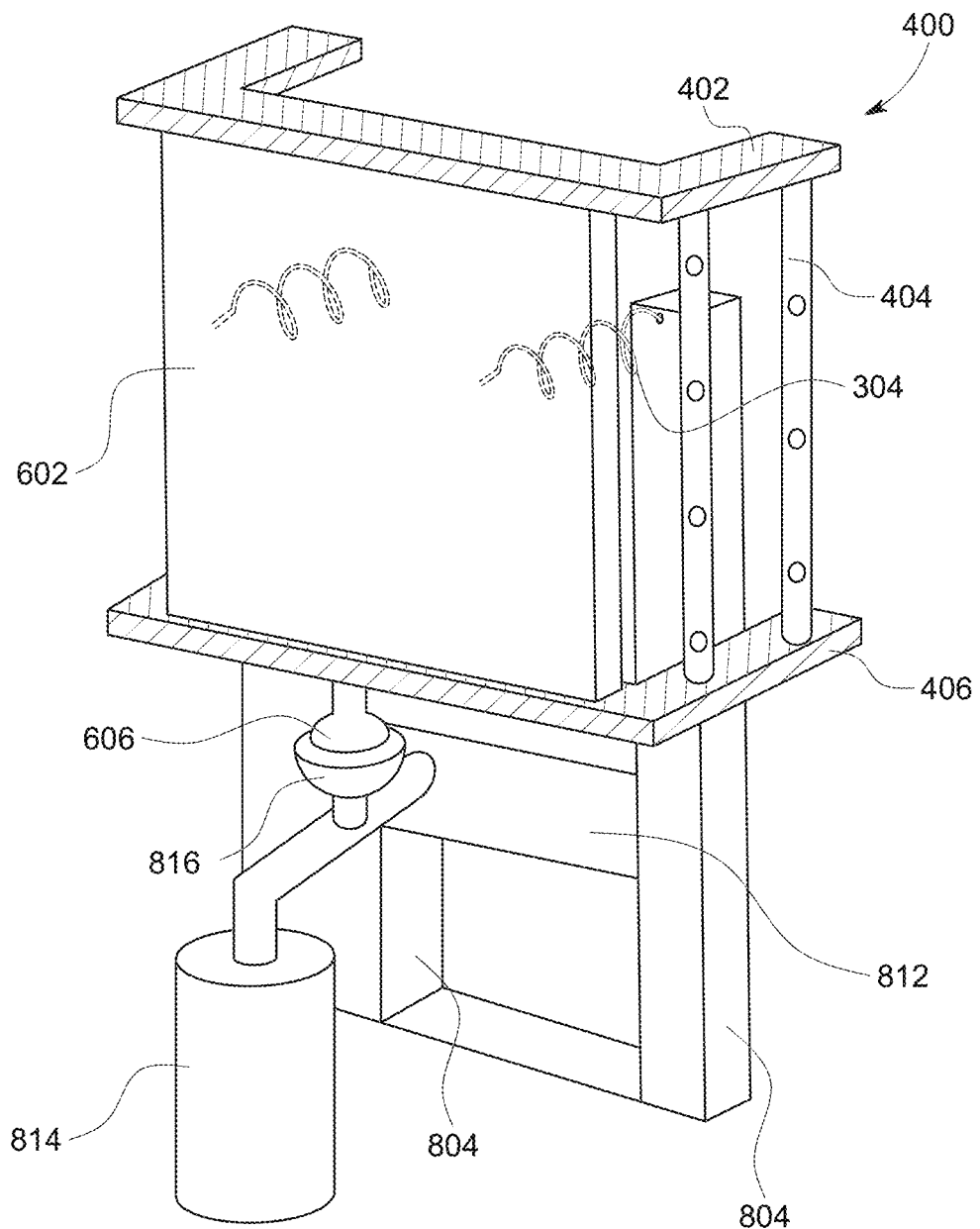
FIG. 18 is a perspective view of the mounting post with the base support structure of FIG. 17 with the multi-rod height adjuster assembly of FIG. 7 in accordance with the principles of the present disclosure.
Figure 19:
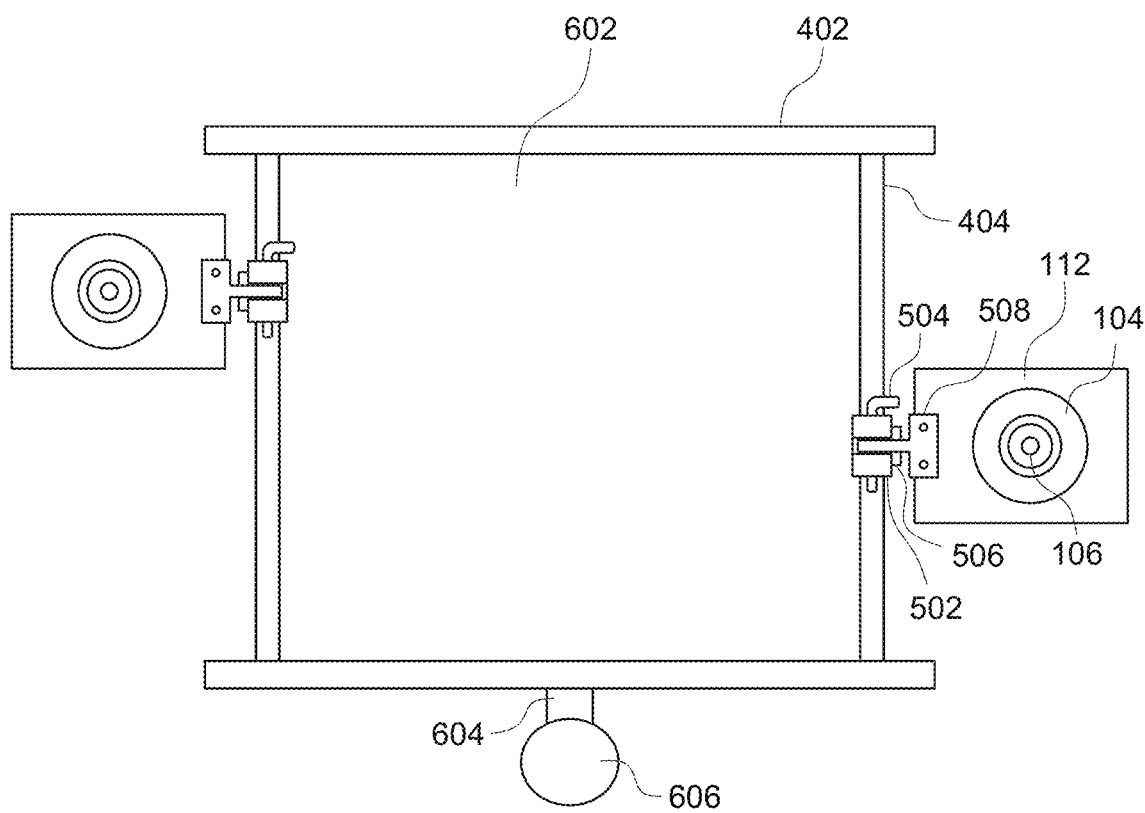
FIG. 19 is a front view of the base support structure of FIG. 12, with the multi-rod height adjuster assembly of FIG. 7, the resistive ball-socket apparatus of FIG. 3 and the various components of the coupling mechanism of FIG. 10 in accordance with the principles of the present disclosure.
Figure 20:
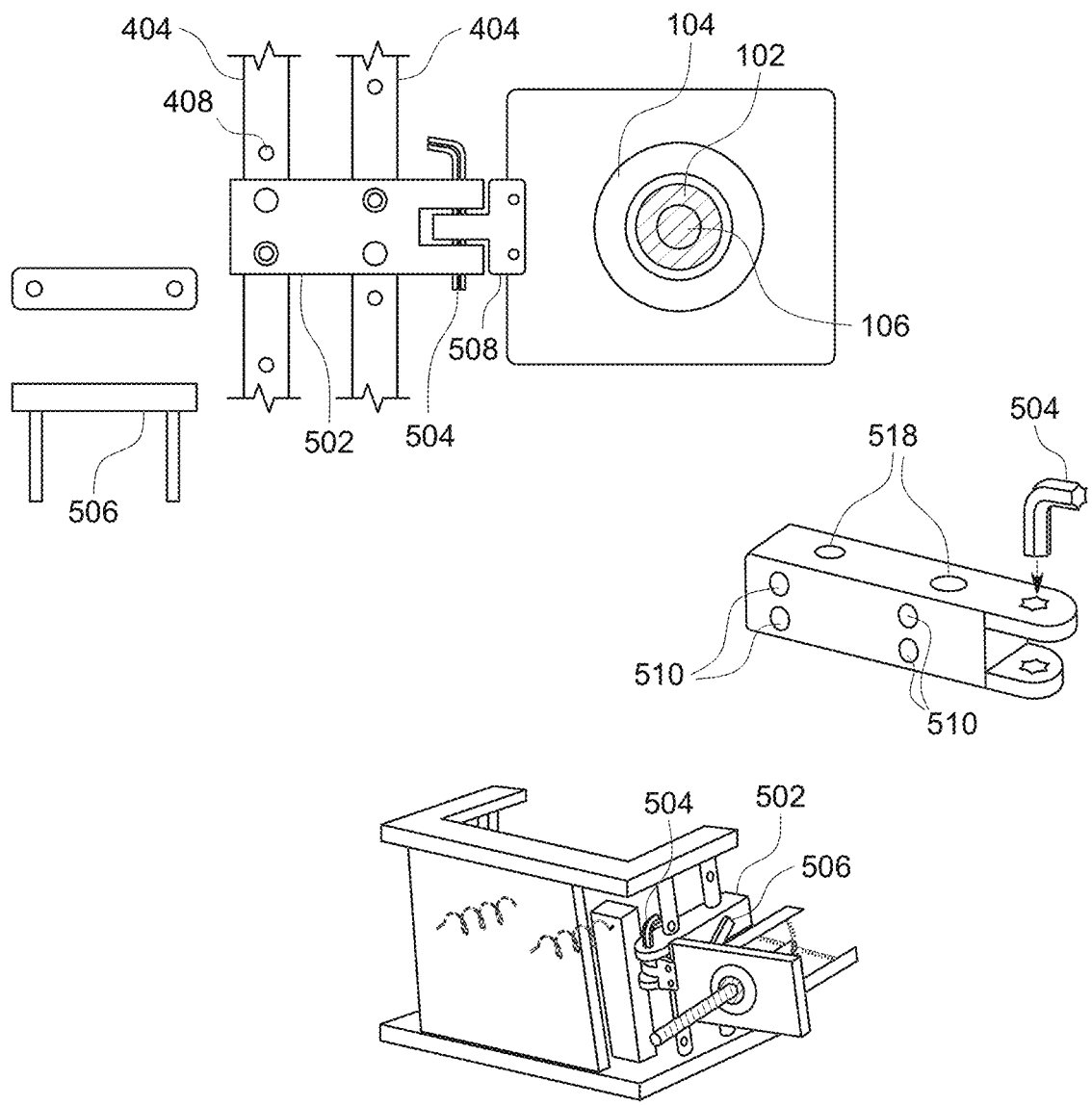
FIG. 20 are various views illustrating the functionalities of the coupling mechanism of FIG. 10 in accordance with the principles of the present disclosure.

FIG. 17 illustrates the base support structure 600 as it is intended to be mounted to the mounting post 814 in accordance with some implementations. FIG. 18 illustrates the multi-rod height adjuster assembly 400 mounted to the mounting post 800. FIG. 19 is a front view illustrating the base support structure 600, the multi-rod height adjuster assembly 400, the coupling mechanism 502, 504, 506, 508 and two resistive ball-socket apparatus 200 assembled together in accordance with some implementations. In some implementations, the fore shaft 106 for the left resistive ball-socket apparatus 200 will be separated from the fore shaft 106 for the right resistive ball-socket apparatus 200 by eighteen to twenty-six inches thereby mimicking the width of the shoulders of a standard adult male, although other separation distance may be readily substituted in alternative variants. FIG. 20 illustrates operation of the coupling mechanism 502, 504, 506, 508 with the multi-rod height adjuster assembly 400. The completed assembly is advantageously modular in construction with the use of individual sub-assemblies resulting in a customizable martial arts training apparatus. This modular construction allows for custom configurations for advanced practitioners.

Figure 29:
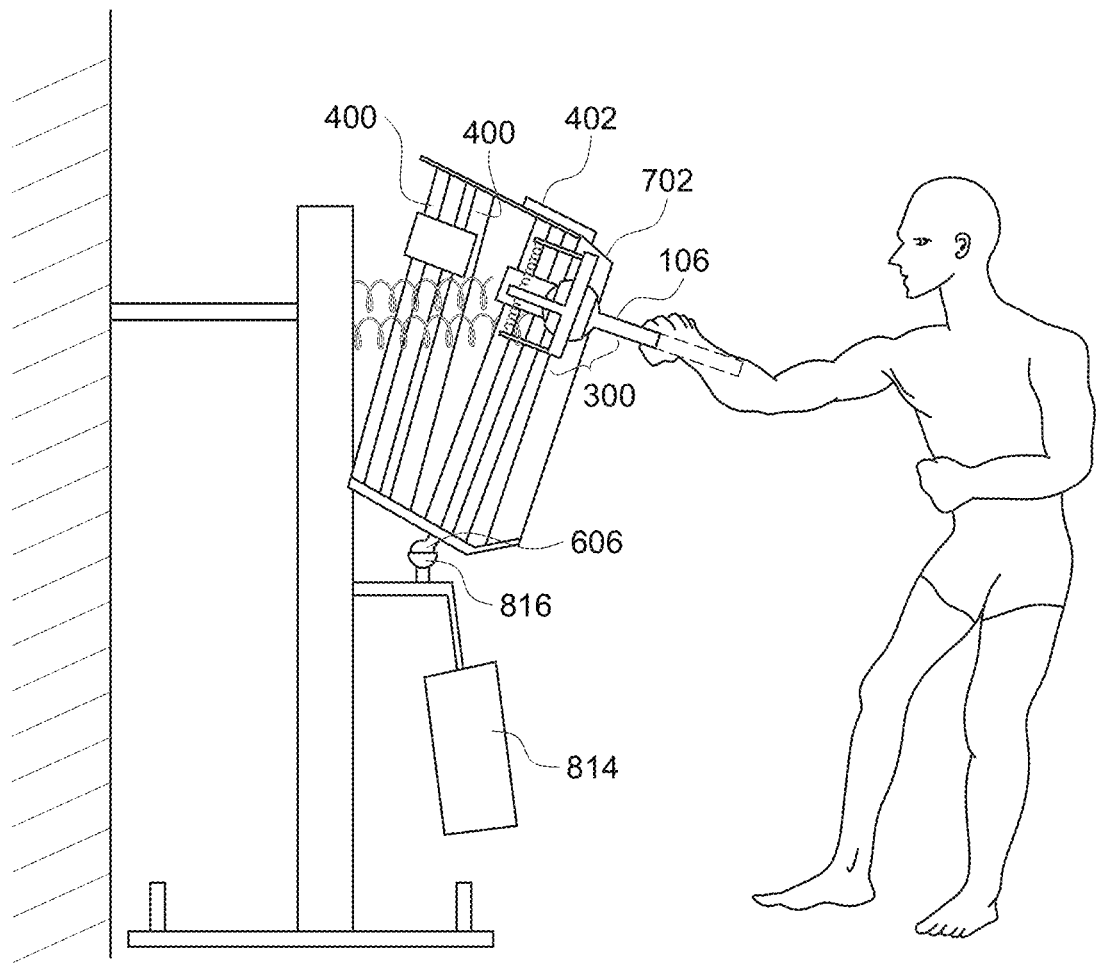
FIG. 29 is a perspective view illustrating example motion for back resistances in accordance with the principles of the present disclosure.
Figure 30:
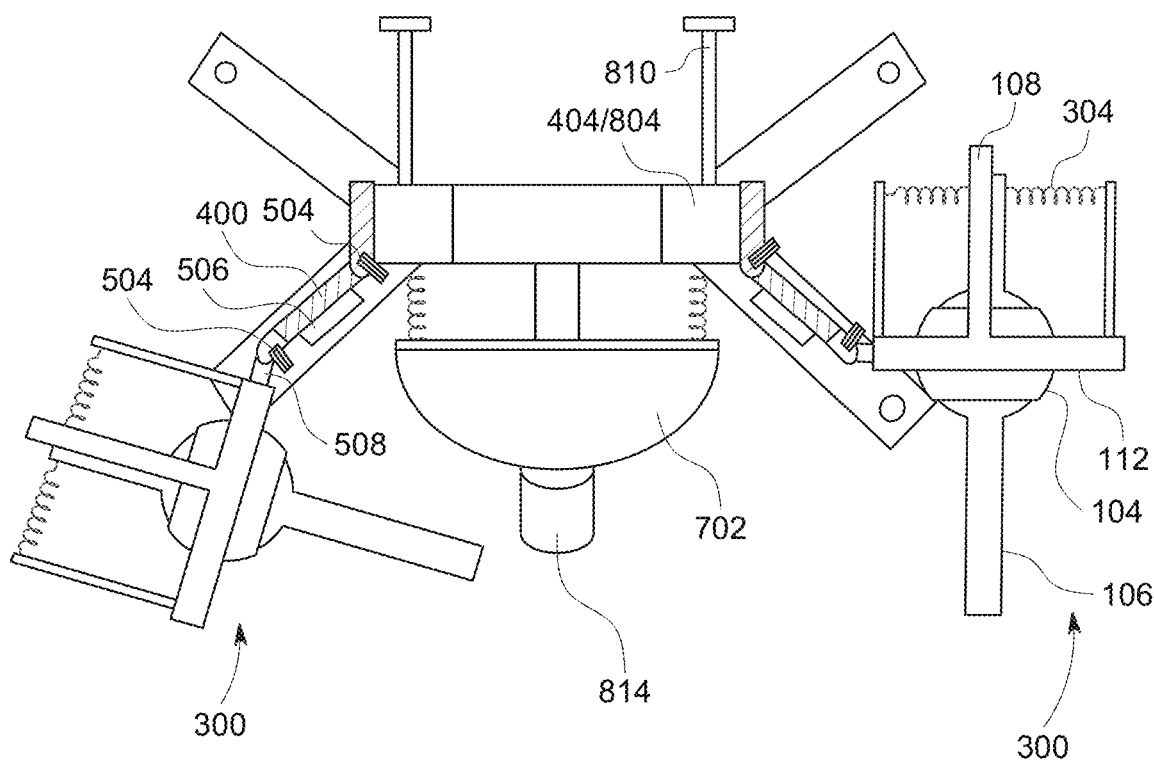
FIG. 30 is a top view of an exemplary martial arts training apparatus in accordance with the principles of the present disclosure.
Figure 31:
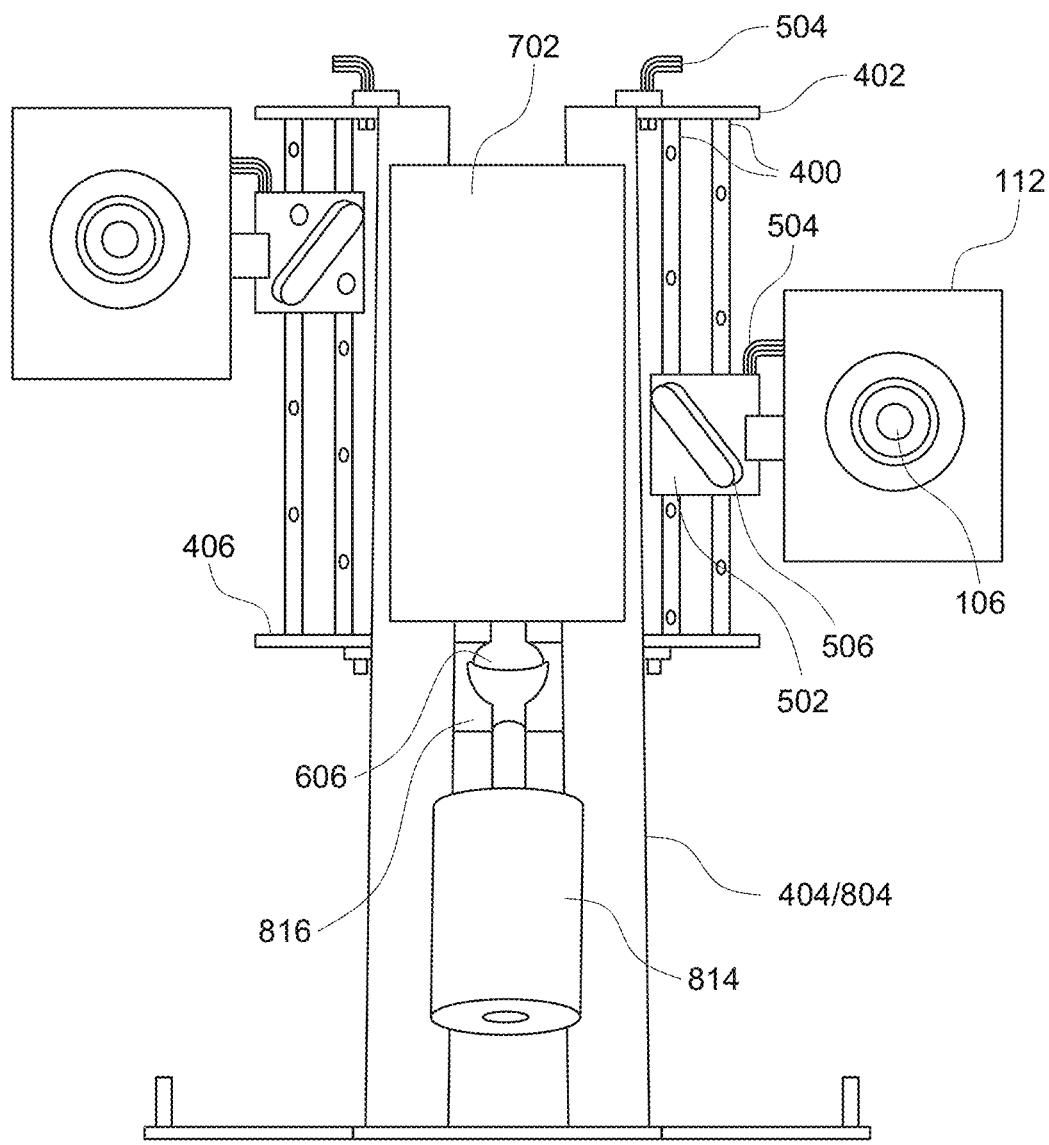
FIG. 31 is a front view of the exemplary martial arts training apparatus of FIG. 30 in accordance with the principles of the present disclosure.
Figure 32:
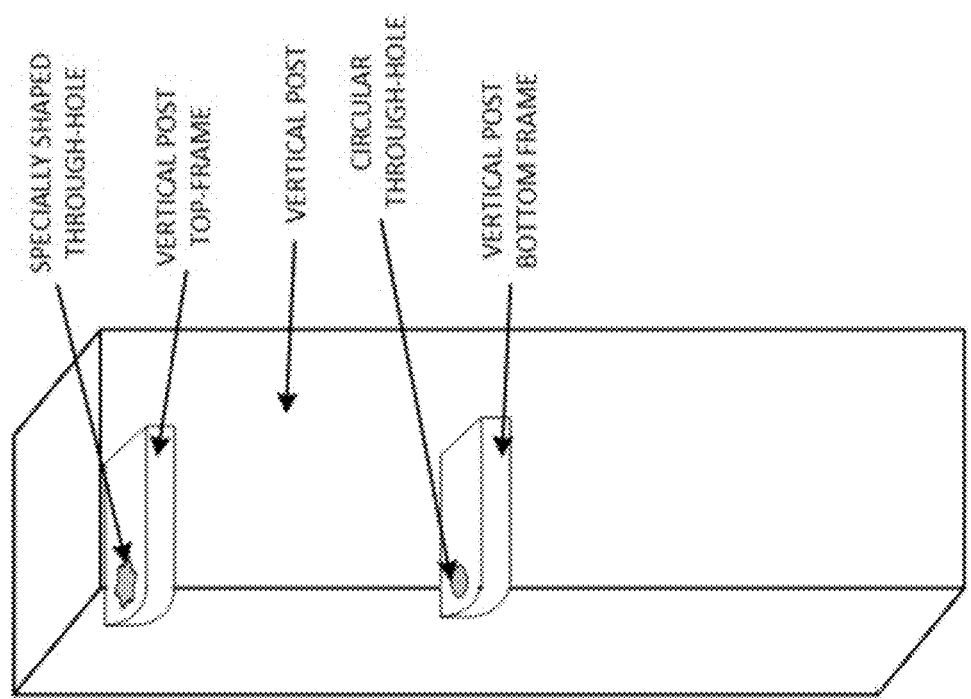
FIG. 32 is a perspective view of a vertical pose frame for a dual-rod height adjuster in accordance with the principles of the present disclosure.
Figure 33:
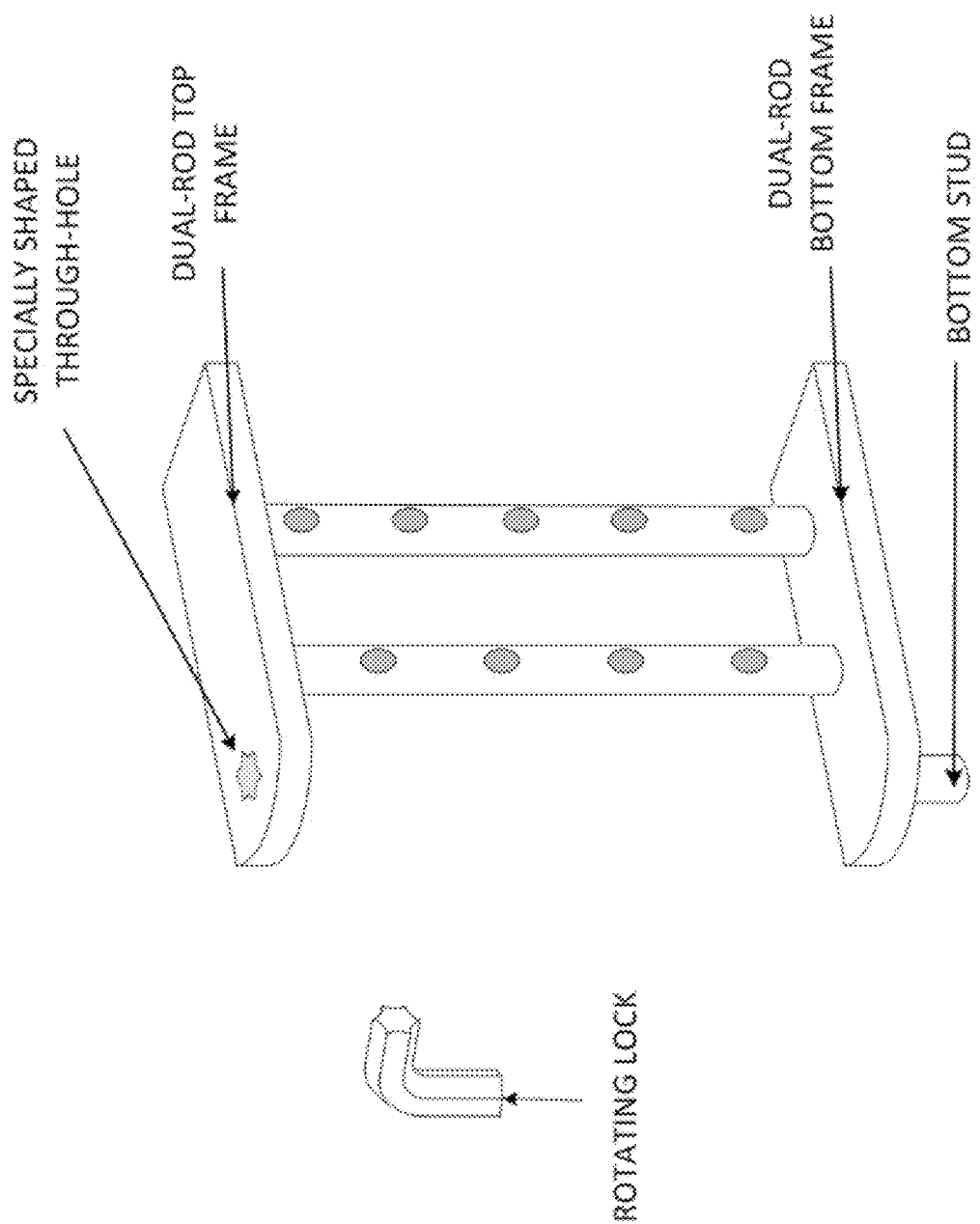
FIG. 33 is a perspective view of the dual-rod height adjuster frame in accordance with the principles of the present disclosure.

Referring now to FIGS. 31-33, another exemplary implementation of a martial arts training and conditioning apparatus is shown and described in detail. Referring now to FIG. 31, the primary difference between the illustrated implementation and that shown in, for example, FIGS. 18 and 29 is that the multi-rod height adjuster assembly 400 is connected to the outside of the vertical post as opposed to, for example, the mounting post. Each of the multi-rod adjuster assemblies 400 is independent of the other one, thereby enabling independent articulation of the multi-rod height adjuster assembly 400 from one another. Each multi-rod adjuster assembly 400 may be coupled to a vertical post via the use of a specially shaped through hole (similar to that depicted in FIG. 11) and a circular through hole. In the embodiment illustrated, the specially shaped through hole is depicted as residing above the circular through hole, although it is appreciated that these positions may be swapped in some implementations. Accordingly, such an arrangement allows for the varying of the angular position of, for example, the resistive ball-socket apparatus 200 with respect to the base support structure 600. Such an arrangement may possess better stability for the complete apparatus under heavy resistance conditions. Additionally, the variable angular positioning of the multi-rod height adjuster assembly 400 with respect to the base 600, along with the angular rotational positioning of the resistive ball-socket apparatus 200 with respect to the multi-rod height adjuster assembly 400 facilitates positional flexibility for performing different martial arts exercises. The independence of the multi-rod height adjuster assemblies 400, and hence the resistive ball-socket apparatus 200 on the left and right side of the apparatus implies minimal motion transfer and facilitates simultaneous performance of left and right sided exercises.

Resistive Gyro-Shaft Mechanism—

Referring now to FIGS. 23-27, various components for a resistive gyro-shaft mechanism are shown and described in detail. The resistive gyro-shaft mechanism utilizes a gyroscope framework to simulate a human shoulder along with the shaft and attached resistances. The gyro-shaft mechanism may be utilized in conjunction with the various apparatus previously described herein with respect to FIGS. 1-19, or may be used alternatively from, for example, the resistive ball socket apparatus 200. In other words, the gyro-shaft mechanism may replace the resistive ball socket apparatus 200 in some variants. The gyro-shaft mechanism may include an inner ring 900 that contains two apertures 906 on opposing ends, and two studs 904 on the outer side of the ring 900, each at approximately a 90°-degree angular displacement from the apertures 906 at opposite side of the other stud 904. See, e.g., FIG. 23. The gyro-shaft mechanism may also include an outer ring 950 that contains two apertures 956 on opposite ends that are sized to fit the studs 904 of the inner ring 900. The outer ring 950 may also contain two studs 954 on the outside that are oriented at 90° from the apertures 956 and on opposing ends from one another. See e.g., FIG. 24. These studs 954 may eventually go into the corresponding apertures of the same ball-socket base as used for the resistive ball-socket apparatus 200 described previously supra. The diameter of the outer ring 950 is greater than the diameter of the inner ring 900, such that the inner ring 900 fits inside of the outer ring 950.

Figure 25:
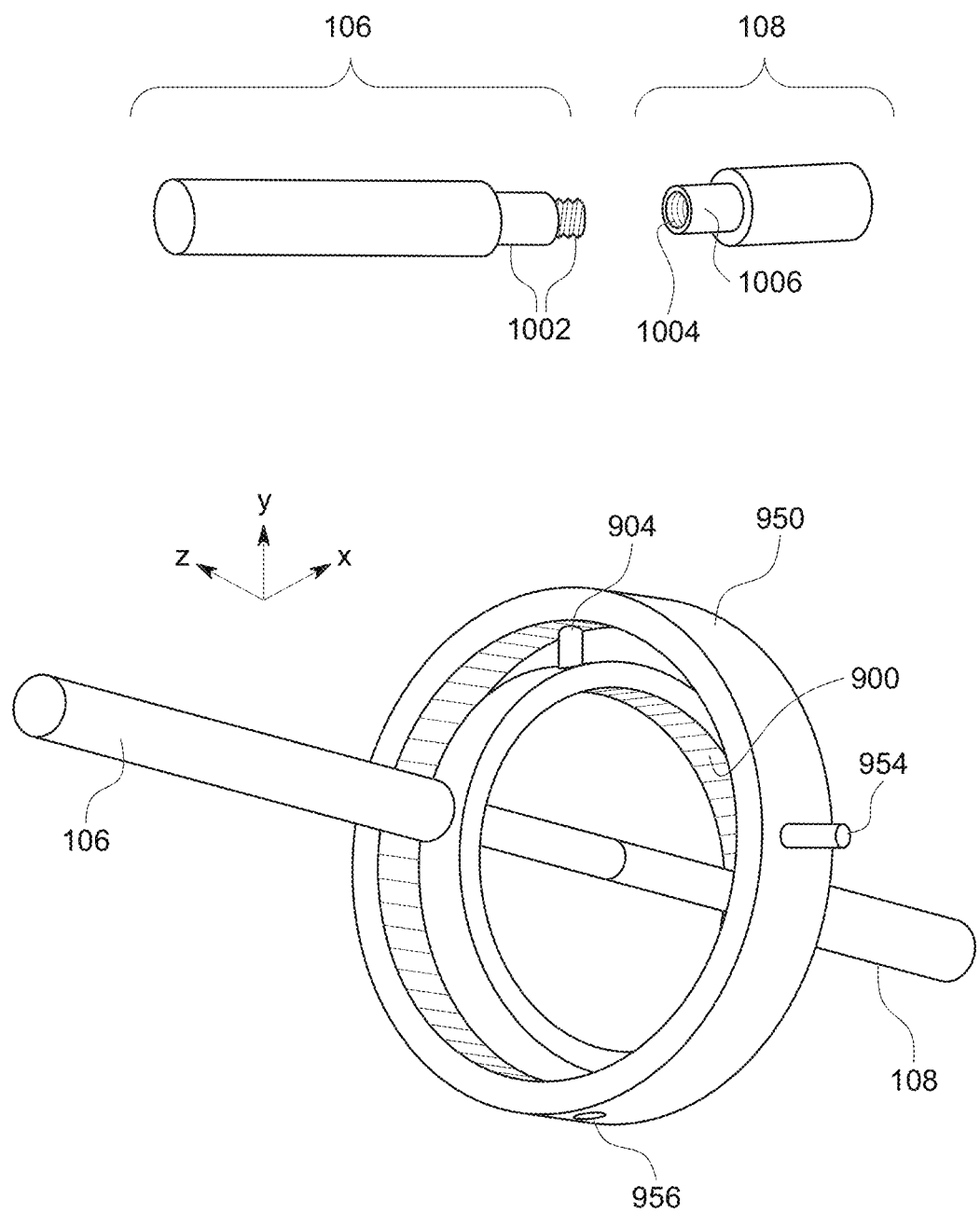
FIG. 25 are perspective views illustrating the assembly of a gyro-shaft resistive mechanism in accordance with the principles of the present disclosure.

FIG. 25 illustrates an exemplary shaft 106, 108 for use with the inner 900 and outer rings 950 of the resistive gyro-shaft mechanism. As illustrated, the shaft may include a number of varying diameters along its length. The fore shaft 106 and the back shaft 108 are separate from each other and can be screwed together to allow motion transfer from the fore shaft 106 to the back shaft 108, and resistance transfer from the back shaft 108 to the fore shaft 106. The thinner portions 1006 of the fore shaft 106 and the back shaft 108 are inserted through the apertures 906 of the inner ring 900 and screwed on inside the inner ring 900. The aperture 906 diameter of the inner ring 900 is such that it allows the shafts to rotate easily inside it; however, it does not allow the shaft to get displaced in some implementations. Another variation could also be that the thinner portion 1006 of the fore shaft 106 continues through both the apertures 906 of the inner ring 900 and extends towards the back to itself become the back shaft 108, albeit with a different cross-sectional diameter than the fore shaft 106. In this example, the fore shaft 106 and back shaft 108 will be a single continuous piece.

Figure 26:
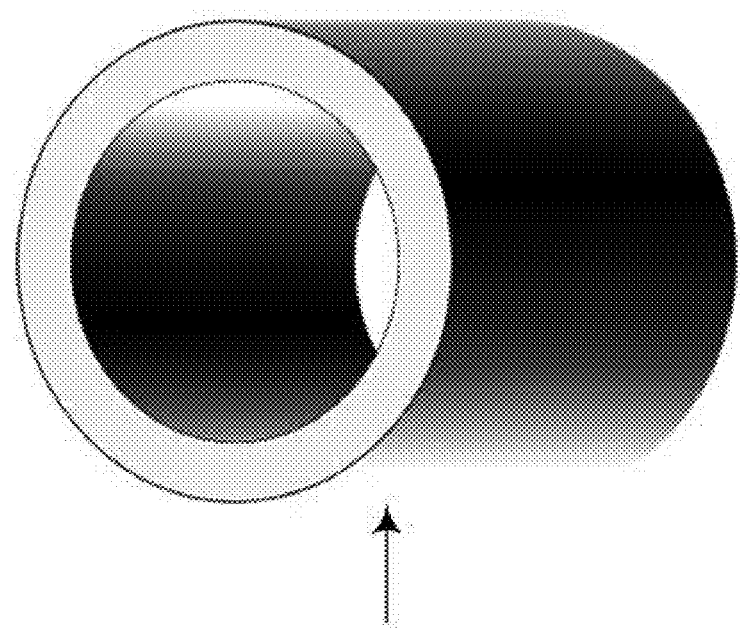
FIG. 26 is a perspective view of a stabilizing structure for use with the gyro-shaft resistive mechanism of FIG. 25 in accordance with the principles of the present disclosure.
Figure 27:
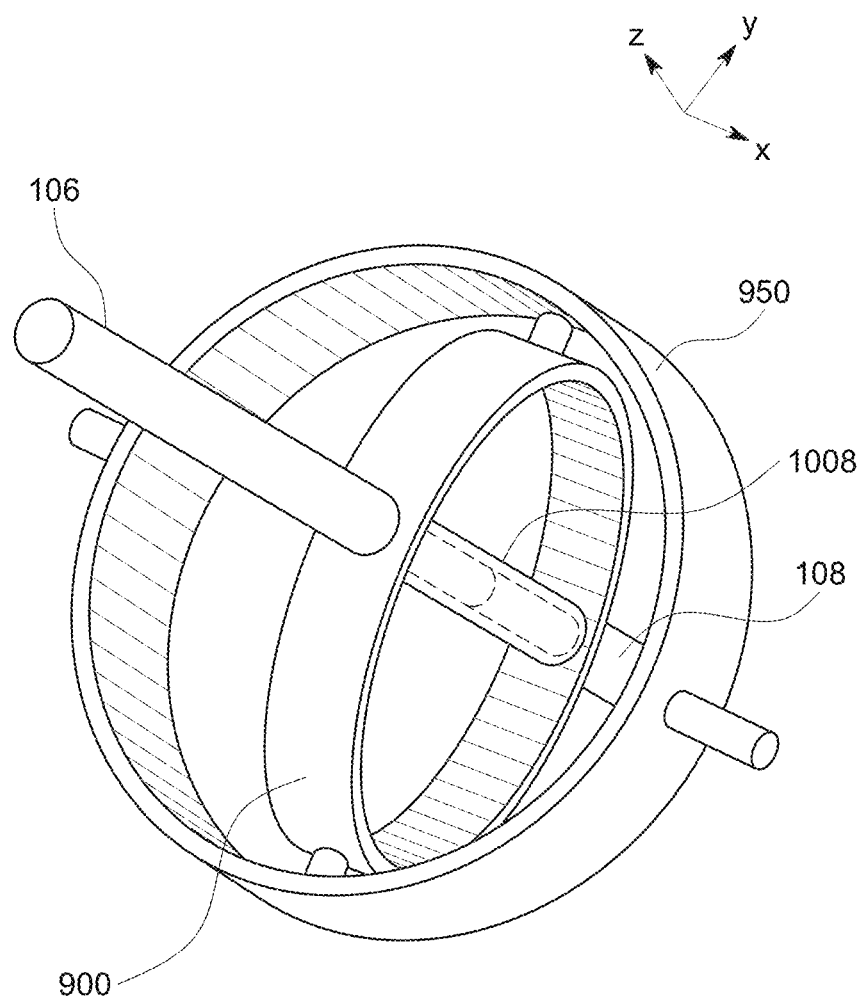
FIG. 27 is a perspective view of the stabilizing structure of FIG. 26 installed on the gyro-shaft resistive mechanism of FIG. 25 in accordance with the principles of the present disclosure.

Optionally, the resistive gyro-shaft mechanism may contain a shaft stabilizing structure 1008, as is shown in FIG. 26. This structure 1008 may restrict the bending and buckling of the portion of the shaft that falls inside the inner ring 900 due to applied forces. This portion of the shaft may be prone to bending and buckling because of its smaller dimensions and threading structures as compared with the diameter of outer portion of the fore shaft 106 and back shaft 108. The stabilizing structure 1008 is a tube-like structure made up of rigid materials which minimize the amount of flex or bend under applied loads. This structure may prevent the bending or flexing of the shaft and prevent breakage.

Figure 28:
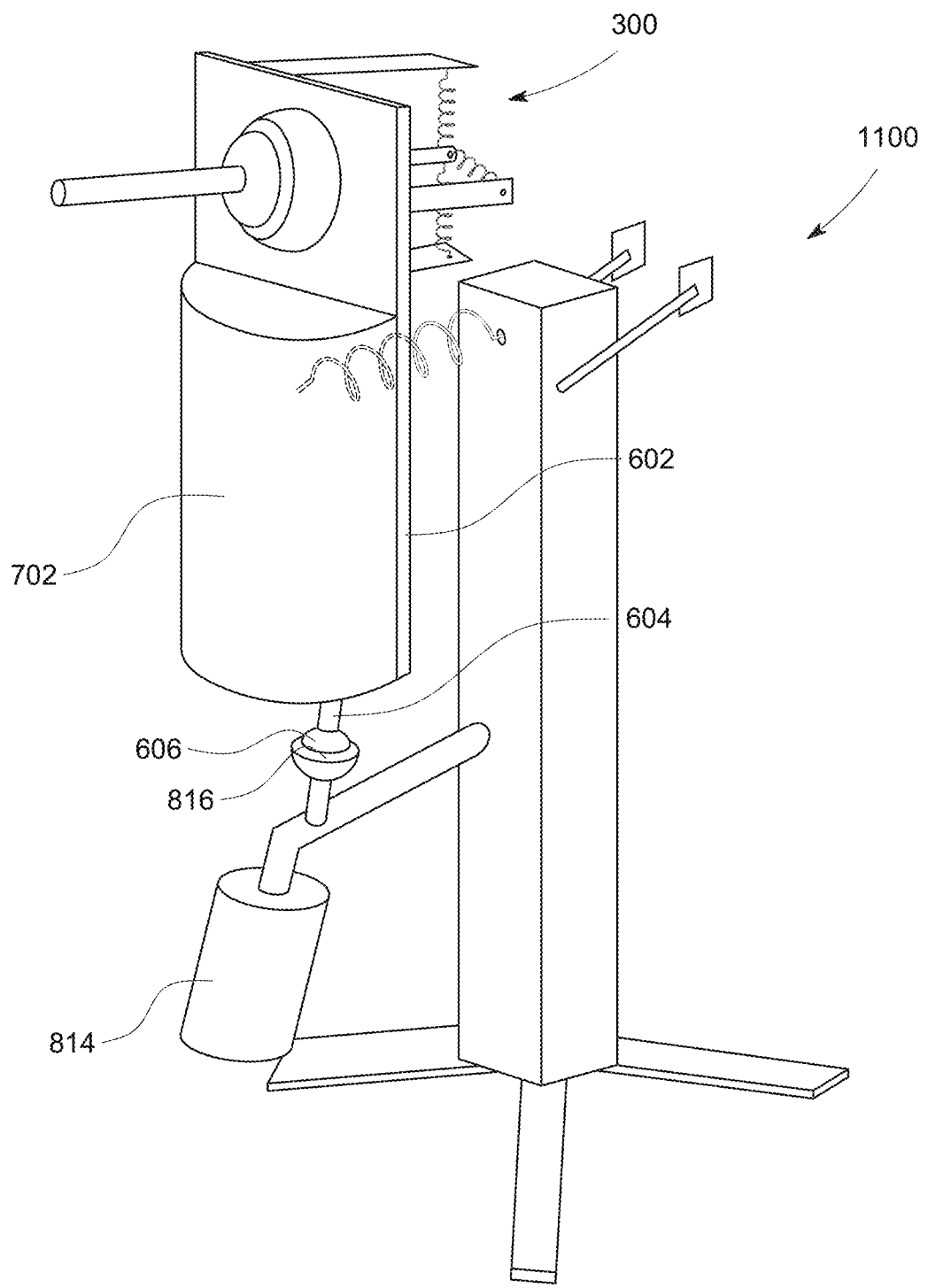
FIG. 28 is a perspective view of a singleton assembly in accordance with the principles of the present disclosure.

FIGS. 28 and 29 illustrate exemplary usage scenarios for the mechanisms described herein. FIG. 28 illustrates a singleton assembly 1100 that consists of one resistive ball-socket joint assembly 300 (or one resistive gyro-shaft mechanism) and one base assembly. The singleton assembly 1100 may also include a vertical and horizontal mounting support along with the wall mount. FIG. 29 illustrates the ball-socket assembly 300 attached to the base assembly. In some implementations, the ball-socket assembly 300 could be unattached to the base assembly such that an angular displacement in the base assembly will not cause a displacement in the ball-socket assembly 300. Other variants may use a cable-pulley mechanism along with weights in order to provide static resistance instead of the elastic resistances (as depicted with the spring elements).

It will be recognized that while certain aspects of the present disclosure are described in terms of specific design examples, these descriptions are only illustrative of the broader methods of the disclosure, and may be modified as required by the particular design. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure described and claimed herein.

While the above detailed description has shown, described, and pointed out novel features of the present disclosure as applied to various embodiments, it will be understood that various omissions, substitutions, and changes in the form and details of the device or process illustrated may be made by those skilled in the art without departing from the principles of the present disclosure. The foregoing description is of the best mode presently contemplated of carrying out the present disclosure. This description is in no way meant to be limiting, but rather should be taken as illustrative of the general principles of the present disclosure. The scope of the present disclosure should be determined with reference to the claims.

What is claimed is:

1. A martial arts conditioning apparatus, the martial arts conditioning apparatus comprising:
   a multi-rod height adjuster assembly, comprising:
      a bottom frame;
      a top frame; and
      a plurality of rods disposed between the bottom frame and the top frame, each of the plurality of rods comprising a plurality of first apertures; and
   a ball socket apparatus, the ball socket apparatus comprising:
      an encapsulating sphere;
      a core sphere that is configured to be received within the encapsulating sphere;
      a fore shaft that is coupled with the core sphere, the fore shaft configured to interact with a user of the martial arts conditioning apparatus; and
      a back shaft that is coupled with the core sphere opposite from the fore shaft, the back shaft further configured to be coupled with a resistive apparatus and/or a dampening apparatus;
   wherein the ball socket apparatus is coupled with one or more of the plurality of rods of the multi-rod height adjuster assembly.

2. The martial arts conditioning apparatus of claim 1, further comprising a base support structure that is configured to mate with the multi-rod height adjuster assembly, the base support structure comprising:
   a base;
   a base support that is coupled with the base; and
   a base core sphere that is coupled with the base support.

3. The martial arts conditioning apparatus of claim 2, further comprising a kicking post, the kicking post comprising padding.

4. The martial arts conditioning apparatus of claim 3, wherein the kicking post comprises a cup-like hollow hemispherical structure, the cup-like hollow hemispherical structure being configured to receive the base core sphere of the base support structure.

5. The martial arts conditioning apparatus of claim 4, further comprising one or more elastic objects that couple the base of the base support structure to the multi-rod height adjuster assembly.

6. The martial arts conditioning apparatus of claim 5, wherein the base of the base support structure has padding attached thereto.

7. The martial arts conditioning apparatus of claim 6, wherein the padding attached to the base of the base support structure comprises a circular prism shape.

8. The martial arts conditioning apparatus of claim 2, further comprising one or more elastic objects that couple the base of the base support structure to the multi-rod height adjuster assembly.

9. The martial arts conditioning apparatus of claim 8, wherein the base of the base support structure has padding attached thereto.

10. The martial arts conditioning apparatus of claim 9, wherein the padding attached to the base of the base support structure comprises a trapezoidal prism shape.

11. The martial arts conditioning apparatus of claim 1, wherein the ball socket apparatus further comprises a ball socket base, the ball socket base being coupled to the encapsulating sphere, the ball socket base further being oriented orthogonal with the fore shaft and the back shaft.

12. The martial arts conditioning apparatus of claim 11, further comprising the resistive apparatus and/or the dampening apparatus, the resistive apparatus and/or the dampening apparatus being coupled to the back shaft of the ball socket apparatus.

13. The martial arts conditioning apparatus of claim 12, wherein the resistive apparatus and/or the dampening apparatus is oriented orthogonal with the back shaft of the ball socket apparatus.

14. The martial arts conditioning apparatus of claim 12, wherein the resistive apparatus and/or the dampening apparatus is oriented parallel with the back shaft of the ball socket apparatus.

15. The martial arts conditioning apparatus of claim 12, wherein the resistive apparatus and/or the dampening apparatus comprises a plurality of resistive apparatus and/or a plurality of dampening apparatus, wherein individual ones of the plurality of resistive apparatus and/or the plurality of dampening apparatus are collectively oriented both parallel and orthogonal with the back shaft of the ball socket apparatus.

16. The martial arts conditioning apparatus of claim 1, further comprising a coupling mechanism that couples the ball socket apparatus to the one or more of the plurality of rods of the multi-rod height adjuster assembly, the coupling mechanism comprising:
   a slider clasp comprising a plurality of second apertures;
   a slider lock configured to be received within individual ones of the plurality of first apertures and individual ones of the plurality of second apertures;
   a rotating clasp that is configured to be coupled to the slider clasp; and
   a rotating lock that is configured to be received within both the rotating clasp and the slider clasp.

17. The martial arts conditioning apparatus of claim 16, wherein the rotating lock comprises a shaft having a plurality of points along the shaft of the rotating lock.

18. The martial arts conditioning apparatus of claim 17, wherein the plurality of points enable the ball socket apparatus to be oriented at a plurality of angles with respect to the multi-rod height adjuster assembly.

19. The martial arts conditioning apparatus of claim 1, further comprising a gyro-shaft apparatus, the gyro-shaft apparatus comprising:
   an inner ring comprising a plurality of first apertures and a plurality of first studs;
   an outer ring that is larger in diameter than the inner ring, the outer ring comprising a plurality of second apertures and a plurality of second studs, at least a portion of the plurality of second apertures configured to receive the plurality of first studs;
   a fore shaft for the gyro-shaft apparatus comprising a first threaded interface, a back shaft for the gyro-shaft apparatus comprising a second threaded interface, the fore shaft for the gyro-shaft apparatus and the back shaft for the gyro-shaft apparatus configured to be received within respective apertures of the plurality of first apertures on the inner ring, the first threaded interface configured to be mated with the second threaded interface;
   wherein the back shaft for the gyro-shaft apparatus is configured to have one or more resistive and/or dampening elements attached thereto.

\* \* \* \* \*